(12) United States Patent
Choeiprathum et al.

(10) Patent No.: US 8,958,167 B1
(45) Date of Patent: Feb. 17, 2015

(54) DETECTION OF DISK SURFACE IRREGULARITIES IN DATA STORAGE DEVICES

(71) Applicant: Western Digital Technologies, Inc., Irvine, CA (US)

(72) Inventors: Wiriya Choeiprathum, Ubonratchatani (TH); Aimamorn Suvichakorn, Pakkret (TH)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/179,355

(22) Filed: Feb. 12, 2014

Related U.S. Application Data

(60) Provisional application No. 61/920,400, filed on Dec. 23, 2013.

(51) Int. Cl.
*G11B 5/09* (2006.01)
*G11B 19/04* (2006.01)

(52) U.S. Cl.
CPC ................................ *G11B 19/048* (2013.01)
USPC .......................................................... 360/46

(58) Field of Classification Search
None
See application file for complete search history.

(56) References Cited

U.S. PATENT DOCUMENTS

| | | | |
|---|---|---|---|
| 6,018,789 A | 1/2000 | Sokolov et al. | |
| 6,065,095 A | 5/2000 | Sokolov et al. | |
| 6,078,452 A | 6/2000 | Kittilson et al. | |
| 6,081,447 A | 6/2000 | Lofgren et al. | |
| 6,092,149 A | 7/2000 | Hicken et al. | |
| 6,092,150 A | 7/2000 | Sokolov et al. | |
| 6,094,707 A | 7/2000 | Sokolov et al. | |
| 6,105,104 A | 8/2000 | Guttmann et al. | |
| 6,111,717 A | 8/2000 | Cloke et al. | |
| 6,145,052 A | 11/2000 | Howe et al. | |
| 6,175,893 B1 | 1/2001 | D'Souza et al. | |
| 6,178,056 B1 | 1/2001 | Cloke et al. | |
| 6,191,909 B1 | 2/2001 | Cloke et al. | |
| 6,195,218 B1 | 2/2001 | Guttmann et al. | |
| 6,205,494 B1 | 3/2001 | Williams | |
| 6,208,477 B1 | 3/2001 | Cloke et al. | |
| 6,223,303 B1 | 4/2001 | Billings et al. | |
| 6,230,233 B1 | 5/2001 | Lofgren et al. | |
| 6,246,346 B1 | 6/2001 | Cloke et al. | |
| 6,249,393 B1 | 6/2001 | Billings et al. | |
| 6,256,695 B1 | 7/2001 | Williams | |
| 6,262,857 B1 | 7/2001 | Hull et al. | |
| 6,263,459 B1 | 7/2001 | Schibilla | |
| 6,272,694 B1 | 8/2001 | Weaver et al. | |
| 6,278,568 B1 | 8/2001 | Cloke et al. | |

(Continued)

OTHER PUBLICATIONS

U.S. Appl. No. 13/922,417, filed Jun. 20, 2013, to Knigge et al., 22 pages.

*Primary Examiner* — K. Wong

(57) ABSTRACT

Detecting surface irregularities on a disk of a data storage device (DSD) includes reading data from a first side of the disk using a first head of the DSD. A first set of variable gain amplifier (VGA) values is generated which is related to the reading of data from the first side using the first head. Data is read from a second side of the disk using a second head of the DSD and a second set of VGA values is generated which is related to the reading of data from the second side using the second head. A profile for the disk is determined using the first set of VGA values and the second set of VGA values. The profile is compared to at least one threshold to detect surface irregularities on the disk.

24 Claims, 17 Drawing Sheets

(56) References Cited

U.S. PATENT DOCUMENTS

| | | | |
|---|---|---|---|
| 6,279,089 B1 | 8/2001 | Schibilla et al. |
| 6,289,484 B1 | 9/2001 | Rothberg et al. |
| 6,292,912 B1 | 9/2001 | Cloke et al. |
| 6,310,740 B1 | 10/2001 | Dunbar et al. |
| 6,317,850 B1 | 11/2001 | Rothberg |
| 6,327,106 B1 | 12/2001 | Rothberg |
| 6,337,778 B1 | 1/2002 | Gagne |
| 6,369,969 B1 | 4/2002 | Christiansen et al. |
| 6,384,999 B1 | 5/2002 | Schibilla |
| 6,388,833 B1 | 5/2002 | Golowka et al. |
| 6,405,342 B1 | 6/2002 | Lee |
| 6,408,357 B1 | 6/2002 | Hanmann et al. |
| 6,408,406 B1 | 6/2002 | Parris |
| 6,411,452 B1 | 6/2002 | Cloke |
| 6,411,458 B1 | 6/2002 | Billings et al. |
| 6,412,083 B1 | 6/2002 | Rothberg et al. |
| 6,415,349 B1 | 7/2002 | Hull et al. |
| 6,417,981 B1 | 7/2002 | Smith |
| 6,425,128 B1 | 7/2002 | Krapf et al. |
| 6,441,981 B1 | 8/2002 | Cloke et al. |
| 6,442,328 B1 | 8/2002 | Elliott et al. |
| 6,445,524 B1 | 9/2002 | Nazarian et al. |
| 6,449,767 B1 | 9/2002 | Krapf et al. |
| 6,453,115 B1 | 9/2002 | Boyle |
| 6,470,420 B1 | 10/2002 | Hospodor |
| 6,480,020 B1 | 11/2002 | Jung et al. |
| 6,480,349 B1 | 11/2002 | Kim et al. |
| 6,480,932 B1 | 11/2002 | Vallis et al. |
| 6,483,986 B1 | 11/2002 | Krapf |
| 6,487,032 B1 | 11/2002 | Cloke et al. |
| 6,490,635 B1 | 12/2002 | Holmes |
| 6,493,173 B1 | 12/2002 | Kim et al. |
| 6,499,083 B1 | 12/2002 | Hamlin |
| 6,519,104 B1 | 2/2003 | Cloke et al. |
| 6,525,892 B1 | 2/2003 | Dunbar et al. |
| 6,545,830 B1 | 4/2003 | Briggs et al. |
| 6,546,489 B1 | 4/2003 | Frank, Jr. et al. |
| 6,550,021 B1 | 4/2003 | Dalphy et al. |
| 6,552,880 B1 | 4/2003 | Dunbar et al. |
| 6,553,457 B1 | 4/2003 | Wilkins et al. |
| 6,578,106 B1 | 6/2003 | Price |
| 6,580,573 B1 | 6/2003 | Hull et al. |
| 6,594,183 B1 | 7/2003 | Lofgren et al. |
| 6,600,620 B1 | 7/2003 | Krounbi et al. |
| 6,601,137 B1 | 7/2003 | Castro et al. |
| 6,603,622 B1 | 8/2003 | Christiansen et al. |
| 6,603,625 B1 | 8/2003 | Hospodor et al. |
| 6,604,220 B1 | 8/2003 | Lee |
| 6,606,682 B1 | 8/2003 | Dang et al. |
| 6,606,714 B1 | 8/2003 | Thelin |
| 6,606,717 B1 | 8/2003 | Yu et al. |
| 6,611,393 B1 | 8/2003 | Nguyen et al. |
| 6,615,312 B1 | 9/2003 | Hamlin et al. |
| 6,639,748 B1 | 10/2003 | Christiansen et al. |
| 6,647,481 B1 | 11/2003 | Luu et al. |
| 6,654,193 B1 | 11/2003 | Thelin |
| 6,657,810 B1 | 12/2003 | Kupferman |
| 6,661,591 B1 | 12/2003 | Rothberg |
| 6,665,772 B1 | 12/2003 | Hamlin |
| 6,687,073 B1 | 2/2004 | Kupferman |
| 6,687,078 B1 | 2/2004 | Kim |
| 6,687,850 B1 | 2/2004 | Rothberg |
| 6,690,523 B1 | 2/2004 | Nguyen et al. |
| 6,690,882 B1 | 2/2004 | Hanmann et al. |
| 6,691,198 B1 | 2/2004 | Hamlin |
| 6,691,213 B1 | 2/2004 | Luu et al. |
| 6,691,255 B1 | 2/2004 | Rothberg et al. |
| 6,693,760 B1 | 2/2004 | Krounbi et al. |
| 6,694,477 B1 | 2/2004 | Lee |
| 6,697,914 B1 | 2/2004 | Hospodor et al. |
| 6,700,724 B2 | 3/2004 | Riddering et al. |
| 6,704,153 B1 | 3/2004 | Rothberg et al. |
| 6,708,251 B1 | 3/2004 | Boyle et al. |
| 6,710,951 B1 | 3/2004 | Cloke |
| 6,711,628 B1 | 3/2004 | Thelin |
| 6,711,635 B1 | 3/2004 | Wang |
| 6,711,660 B1 | 3/2004 | Milne et al. |
| 6,715,044 B2 | 3/2004 | Lofgren et al. |
| 6,724,982 B1 | 4/2004 | Hamlin |
| 6,725,329 B1 | 4/2004 | Ng et al. |
| 6,735,650 B1 | 5/2004 | Rothberg |
| 6,735,693 B1 | 5/2004 | Hamlin |
| 6,744,772 B1 | 6/2004 | Eneboe et al. |
| 6,745,283 B1 | 6/2004 | Dang |
| 6,751,402 B1 | 6/2004 | Elliott et al. |
| 6,757,481 B1 | 6/2004 | Nazarian et al. |
| 6,772,281 B2 | 8/2004 | Hamlin |
| 6,781,826 B1 | 8/2004 | Goldstone et al. |
| 6,782,449 B1 | 8/2004 | Codilian et al. |
| 6,785,207 B2 * | 8/2004 | Nishimura et al. ........ 369/47.27 |
| 6,791,779 B1 | 9/2004 | Singh et al. |
| 6,792,486 B1 | 9/2004 | Hanan et al. |
| 6,799,274 B1 | 9/2004 | Hamlin |
| 6,811,427 B2 | 11/2004 | Garrett et al. |
| 6,826,003 B1 | 11/2004 | Subrahmanyam |
| 6,826,614 B1 | 11/2004 | Hanmann et al. |
| 6,832,041 B1 | 12/2004 | Boyle |
| 6,832,929 B2 | 12/2004 | Garrett et al. |
| 6,845,405 B1 | 1/2005 | Thelin |
| 6,845,427 B1 | 1/2005 | Atai-Azimi |
| 6,850,443 B2 | 2/2005 | Lofgren et al. |
| 6,851,055 B1 | 2/2005 | Boyle et al. |
| 6,851,063 B1 | 2/2005 | Boyle et al. |
| 6,853,731 B1 | 2/2005 | Boyle et al. |
| 6,854,022 B1 | 2/2005 | Thelin |
| 6,862,660 B1 | 3/2005 | Wilkins et al. |
| 6,880,043 B1 | 4/2005 | Castro et al. |
| 6,882,486 B1 | 4/2005 | Kupferman |
| 6,883,368 B2 | 4/2005 | Smith et al. |
| 6,884,085 B1 | 4/2005 | Goldstone |
| 6,888,831 B1 | 5/2005 | Hospodor et al. |
| 6,892,217 B1 | 5/2005 | Hanmann et al. |
| 6,892,249 B1 | 5/2005 | Codilian et al. |
| 6,892,313 B1 | 5/2005 | Codilian et al. |
| 6,894,854 B1 | 5/2005 | Carlson et al. |
| 6,895,455 B1 | 5/2005 | Rothberg |
| 6,895,500 B1 | 5/2005 | Rothberg |
| 6,898,730 B1 | 5/2005 | Hanan |
| 6,910,099 B1 | 6/2005 | Wang et al. |
| 6,928,470 B1 | 8/2005 | Hamlin |
| 6,931,439 B1 | 8/2005 | Hanmann et al. |
| 6,934,104 B1 | 8/2005 | Kupferman |
| 6,934,713 B2 | 8/2005 | Schwartz et al. |
| 6,940,873 B2 | 9/2005 | Boyle et al. |
| 6,943,978 B1 | 9/2005 | Lee |
| 6,948,165 B1 | 9/2005 | Luu et al. |
| 6,950,267 B1 | 9/2005 | Liu et al. |
| 6,954,733 B1 | 10/2005 | Ellis et al. |
| 6,961,814 B1 | 11/2005 | Thelin et al. |
| 6,965,489 B1 | 11/2005 | Lee et al. |
| 6,965,563 B1 | 11/2005 | Hospodor et al. |
| 6,965,966 B1 | 11/2005 | Rothberg et al. |
| 6,967,799 B1 | 11/2005 | Lee |
| 6,968,422 B1 | 11/2005 | Codilian et al. |
| 6,968,450 B1 | 11/2005 | Rothberg et al. |
| 6,973,495 B1 | 12/2005 | Milne et al. |
| 6,973,570 B1 | 12/2005 | Hamlin |
| 6,976,190 B1 | 12/2005 | Goldstone |
| 6,983,316 B1 | 1/2006 | Milne et al. |
| 6,986,007 B1 | 1/2006 | Procyk et al. |
| 6,986,154 B1 | 1/2006 | Price et al. |
| 6,995,933 B1 | 2/2006 | Codilian et al. |
| 6,996,501 B1 | 2/2006 | Rothberg |
| 6,996,669 B1 | 2/2006 | Dang et al. |
| 7,002,926 B1 | 2/2006 | Eneboe et al. |
| 7,003,674 B1 | 2/2006 | Hamlin |
| 7,006,316 B1 | 2/2006 | Sargenti, Jr. et al. |
| 7,009,820 B1 | 3/2006 | Hogg |
| 7,023,639 B1 | 4/2006 | Kupferman |
| 7,024,491 B1 | 4/2006 | Hanmann et al. |
| 7,024,549 B1 | 4/2006 | Luu et al. |
| 7,024,614 B1 | 4/2006 | Thelin et al. |
| 7,027,716 B1 | 4/2006 | Boyle et al. |
| 7,028,174 B1 | 4/2006 | Atai-Azimi et al. |

(56) References Cited

U.S. PATENT DOCUMENTS

| | | |
|---|---|---|
| 7,031,902 B1 | 4/2006 | Catiller |
| 7,046,465 B1 | 5/2006 | Kupferman |
| 7,046,488 B1 | 5/2006 | Hogg |
| 7,050,252 B1 | 5/2006 | Vallis |
| 7,054,937 B1 | 5/2006 | Milne et al. |
| 7,055,000 B1 | 5/2006 | Severtson |
| 7,055,167 B1 | 5/2006 | Masters |
| 7,057,836 B1 | 6/2006 | Kupferman |
| 7,062,398 B1 | 6/2006 | Rothberg |
| 7,068,449 B2 | 6/2006 | Riddering et al. |
| 7,075,746 B1 | 7/2006 | Kupferman |
| 7,076,604 B1 | 7/2006 | Thelin |
| 7,082,494 B1 | 7/2006 | Thelin et al. |
| 7,088,538 B1 | 8/2006 | Codilian et al. |
| 7,088,545 B1 | 8/2006 | Singh et al. |
| 7,092,186 B1 | 8/2006 | Hogg |
| 7,095,577 B1 | 8/2006 | Codilian et al. |
| 7,099,095 B1 | 8/2006 | Subrahmanyam et al. |
| 7,106,537 B1 | 9/2006 | Bennett |
| 7,106,947 B2 | 9/2006 | Boyle et al. |
| 7,110,202 B1 | 9/2006 | Vasquez |
| 7,111,116 B1 | 9/2006 | Boyle et al. |
| 7,114,029 B1 | 9/2006 | Thelin |
| 7,120,737 B1 | 10/2006 | Thelin |
| 7,120,806 B1 | 10/2006 | Codilian et al. |
| 7,126,776 B1 | 10/2006 | Warren, Jr. et al. |
| 7,129,763 B1 | 10/2006 | Bennett et al. |
| 7,133,600 B1 | 11/2006 | Boyle |
| 7,136,244 B1 | 11/2006 | Rothberg |
| 7,146,094 B1 | 12/2006 | Boyle |
| 7,149,046 B1 | 12/2006 | Coker et al. |
| 7,150,036 B1 | 12/2006 | Milne et al. |
| 7,155,616 B1 | 12/2006 | Hamlin |
| 7,171,108 B1 | 1/2007 | Masters et al. |
| 7,171,110 B1 | 1/2007 | Wilshire |
| 7,180,692 B1 | 2/2007 | Che et al. |
| 7,194,576 B1 | 3/2007 | Boyle |
| 7,200,698 B1 | 4/2007 | Rothberg |
| 7,205,805 B1 | 4/2007 | Bennett |
| 7,206,497 B1 | 4/2007 | Boyle et al. |
| 7,215,496 B1 | 5/2007 | Kupferman et al. |
| 7,215,771 B1 | 5/2007 | Hamlin |
| 7,237,054 B1 | 6/2007 | Cain et al. |
| 7,240,161 B1 | 7/2007 | Boyle |
| 7,249,365 B1 | 7/2007 | Price et al. |
| 7,263,709 B1 | 8/2007 | Krapf |
| 7,274,639 B1 | 9/2007 | Codilian et al. |
| 7,274,659 B2 | 9/2007 | Hospodor |
| 7,275,116 B1 | 9/2007 | Hanmann et al. |
| 7,280,302 B1 | 10/2007 | Masiewicz |
| 7,292,774 B1 | 11/2007 | Masters et al. |
| 7,292,775 B1 | 11/2007 | Boyle et al. |
| 7,296,284 B1 | 11/2007 | Price et al. |
| 7,302,501 B1 | 11/2007 | Cain et al. |
| 7,302,579 B1 | 11/2007 | Cain et al. |
| 7,318,088 B1 | 1/2008 | Mann |
| 7,319,806 B1 | 1/2008 | Willner et al. |
| 7,325,244 B2 | 1/2008 | Boyle et al. |
| 7,330,323 B1 | 2/2008 | Singh et al. |
| 7,346,790 B1 | 3/2008 | Klein |
| 7,366,641 B1 | 4/2008 | Masiewicz et al. |
| 7,369,340 B1 * | 5/2008 | Dang et al. ................ 360/31 |
| 7,369,343 B1 | 5/2008 | Yeo et al. |
| 7,372,650 B1 | 5/2008 | Kupferman |
| 7,380,147 B1 | 5/2008 | Sun |
| 7,392,340 B1 | 6/2008 | Dang et al. |
| 7,404,013 B1 | 7/2008 | Masiewicz |
| 7,406,545 B1 | 7/2008 | Rothberg et al. |
| 7,415,571 B1 | 8/2008 | Hanan |
| 7,436,610 B1 | 10/2008 | Thelin |
| 7,437,502 B1 | 10/2008 | Coker |
| 7,440,214 B1 | 10/2008 | Ell et al. |
| 7,440,219 B2 | 10/2008 | Zhu et al. |
| 7,451,344 B1 | 11/2008 | Rothberg |
| 7,471,483 B1 | 12/2008 | Ferris et al. |
| 7,471,486 B1 | 12/2008 | Coker et al. |
| 7,486,060 B1 | 2/2009 | Bennett |
| 7,496,493 B1 | 2/2009 | Stevens |
| 7,508,617 B1 | 3/2009 | Mak et al. |
| 7,518,819 B1 | 4/2009 | Yu et al. |
| 7,526,184 B1 | 4/2009 | Parkinen et al. |
| 7,539,924 B1 | 5/2009 | Vasquez et al. |
| 7,543,117 B1 | 6/2009 | Hanan |
| 7,551,383 B1 | 6/2009 | Kupferman |
| 7,562,282 B1 | 7/2009 | Rothberg |
| 7,577,973 B1 | 8/2009 | Kapner, III et al. |
| 7,596,797 B1 | 9/2009 | Kapner, III et al. |
| 7,599,139 B1 | 10/2009 | Bombet et al. |
| 7,619,841 B1 | 11/2009 | Kupferman |
| 7,630,162 B2 * | 12/2009 | Zhao et al. ................ 360/75 |
| 7,647,544 B1 | 1/2010 | Masiewicz |
| 7,649,704 B1 | 1/2010 | Bombet et al. |
| 7,653,927 B1 | 1/2010 | Kapner, III et al. |
| 7,656,603 B1 | 2/2010 | Xing |
| 7,656,763 B1 | 2/2010 | Jin et al. |
| 7,657,149 B2 | 2/2010 | Boyle |
| 7,672,072 B1 | 3/2010 | Boyle et al. |
| 7,673,075 B1 | 3/2010 | Masiewicz |
| 7,675,707 B1 | 3/2010 | Liu et al. |
| 7,688,540 B1 | 3/2010 | Mei et al. |
| 7,724,461 B1 | 5/2010 | McFadyen et al. |
| 7,725,584 B1 | 5/2010 | Hanmann et al. |
| 7,730,295 B1 | 6/2010 | Lee |
| 7,760,458 B1 | 7/2010 | Trinh |
| 7,768,776 B1 | 8/2010 | Szeremeta et al. |
| 7,804,657 B1 | 9/2010 | Hogg et al. |
| 7,813,954 B1 | 10/2010 | Price et al. |
| 7,827,320 B1 | 11/2010 | Stevens |
| 7,839,588 B1 | 11/2010 | Dang et al. |
| 7,839,595 B1 | 11/2010 | Chue et al. |
| 7,843,660 B1 | 11/2010 | Yeo |
| 7,852,596 B2 | 12/2010 | Boyle et al. |
| 7,859,782 B1 | 12/2010 | Lee |
| 7,872,822 B1 | 1/2011 | Rothberg |
| 7,898,756 B1 | 3/2011 | Wang |
| 7,898,762 B1 | 3/2011 | Guo et al. |
| 7,900,037 B1 | 3/2011 | Fallone et al. |
| 7,907,364 B2 | 3/2011 | Boyle et al. |
| 7,916,420 B1 | 3/2011 | McFadyen et al. |
| 7,929,234 B1 | 4/2011 | Boyle et al. |
| 7,933,087 B1 | 4/2011 | Tsai et al. |
| 7,933,090 B1 | 4/2011 | Jung et al. |
| 7,934,030 B1 | 4/2011 | Sargenti, Jr. et al. |
| 7,940,491 B2 | 5/2011 | Szeremeta et al. |
| 7,944,639 B1 | 5/2011 | Wang |
| 7,945,727 B2 | 5/2011 | Rothberg et al. |
| 7,949,564 B1 | 5/2011 | Hughes et al. |
| 7,974,029 B2 | 7/2011 | Tsai et al. |
| 7,974,039 B1 | 7/2011 | Xu et al. |
| 7,982,993 B1 | 7/2011 | Tsai et al. |
| 7,984,200 B1 | 7/2011 | Bombet et al. |
| 7,990,648 B1 | 8/2011 | Wang |
| 7,992,179 B1 | 8/2011 | Kapner, III et al. |
| 8,004,785 B1 | 8/2011 | Tsai et al. |
| 8,006,027 B1 | 8/2011 | Stevens et al. |
| 8,014,094 B1 | 9/2011 | Jin |
| 8,014,977 B1 | 9/2011 | Masiewicz et al. |
| 8,019,914 B1 | 9/2011 | Vasquez et al. |
| 8,040,625 B1 | 10/2011 | Boyle et al. |
| 8,059,357 B1 | 11/2011 | Knigge et al. |
| 8,078,943 B1 | 12/2011 | Lee |
| 8,079,045 B2 | 12/2011 | Krapf et al. |
| 8,082,433 B1 | 12/2011 | Fallone et al. |
| 8,085,487 B1 | 12/2011 | Jung et al. |
| 8,089,719 B1 | 1/2012 | Dakroub |
| 8,090,902 B1 | 1/2012 | Bennett et al. |
| 8,090,906 B1 | 1/2012 | Blaha et al. |
| 8,091,112 B1 | 1/2012 | Elliott et al. |
| 8,094,396 B1 | 1/2012 | Zhang et al. |
| 8,094,401 B1 | 1/2012 | Peng et al. |
| 8,116,020 B1 | 2/2012 | Lee |
| 8,116,025 B1 | 2/2012 | Chan et al. |
| 8,134,793 B1 | 3/2012 | Vasquez et al. |
| 8,134,798 B1 | 3/2012 | Thelin et al. |

(56) References Cited

U.S. PATENT DOCUMENTS

| | | | |
|---|---|---|---|
| 8,139,301 B1 | 3/2012 | Li et al. |
| 8,139,310 B1 | 3/2012 | Hogg |
| 8,144,419 B1 | 3/2012 | Liu |
| 8,145,452 B1 | 3/2012 | Masiewicz et al. |
| 8,149,528 B1 | 4/2012 | Suratman et al. |
| 8,154,812 B1 | 4/2012 | Boyle et al. |
| 8,159,768 B1 | 4/2012 | Miyamura |
| 8,161,328 B1 | 4/2012 | Wilshire |
| 8,164,849 B1 | 4/2012 | Szeremeta et al. |
| 8,174,780 B1 | 5/2012 | Tsai et al. |
| 8,190,575 B1 | 5/2012 | Ong et al. |
| 8,194,338 B1 | 6/2012 | Zhang |
| 8,194,340 B1 | 6/2012 | Boyle et al. |
| 8,194,341 B1 | 6/2012 | Boyle |
| 8,201,066 B1 | 6/2012 | Wang |
| 8,271,692 B1 | 9/2012 | Dinh et al. |
| 8,279,550 B1 | 10/2012 | Hogg |
| 8,281,218 B1 | 10/2012 | Ybarra et al. |
| 8,285,923 B2 | 10/2012 | Stevens |
| 8,289,656 B1 | 10/2012 | Huber |
| 8,300,338 B1 * | 10/2012 | McFadyen ............ 360/31 |
| 8,305,705 B1 | 11/2012 | Roohr |
| 8,307,156 B1 | 11/2012 | Codilian et al. |
| 8,310,775 B1 | 11/2012 | Boguslawski et al. |
| 8,315,006 B1 | 11/2012 | Chahwan et al. |
| 8,316,263 B1 | 11/2012 | Gough et al. |
| 8,320,067 B1 | 11/2012 | Tsai et al. |
| 8,320,069 B1 | 11/2012 | Knigge et al. |
| 8,324,974 B1 | 12/2012 | Bennett |
| 8,332,695 B2 | 12/2012 | Dalphy et al. |
| 8,339,919 B1 | 12/2012 | Lee |
| 8,341,337 B1 | 12/2012 | Ong et al. |
| 8,350,628 B1 | 1/2013 | Bennett |
| 8,356,184 B1 | 1/2013 | Meyer et al. |
| 8,370,683 B1 | 2/2013 | Ryan et al. |
| 8,375,225 B1 | 2/2013 | Ybarra |
| 8,375,274 B1 | 2/2013 | Bonke |
| 8,380,922 B1 | 2/2013 | DeForest et al. |
| 8,390,948 B2 | 3/2013 | Hogg |
| 8,390,952 B1 | 3/2013 | Szeremeta |
| 8,392,689 B1 | 3/2013 | Lott |
| 8,407,393 B1 | 3/2013 | Yolar et al. |
| 8,413,010 B1 | 4/2013 | Vasquez et al. |
| 8,417,566 B2 | 4/2013 | Price et al. |
| 8,421,663 B1 | 4/2013 | Bennett |
| 8,422,172 B1 | 4/2013 | Dakroub et al. |
| 8,427,770 B1 | 4/2013 | O'Dell et al. |
| 8,427,771 B1 | 4/2013 | Tsai |
| 8,429,343 B1 | 4/2013 | Tsai |
| 8,433,937 B1 | 4/2013 | Wheelock et al. |
| 8,433,977 B1 | 4/2013 | Vasquez et al. |
| 8,441,909 B1 | 5/2013 | Thayamballi et al. |
| 8,456,980 B1 | 6/2013 | Thayamballi |
| 8,458,526 B2 | 6/2013 | Dalphy et al. |
| 8,462,466 B2 | 6/2013 | Huber |
| 8,467,151 B1 | 6/2013 | Huber |
| 8,483,027 B1 | 7/2013 | Mak et al. |
| 8,489,841 B1 | 7/2013 | Strecke et al. |
| 8,493,679 B1 | 7/2013 | Boguslawski et al. |
| 8,499,198 B1 | 7/2013 | Messenger et al. |
| 8,514,506 B1 | 8/2013 | Li et al. |
| 8,554,741 B1 | 10/2013 | Malina |
| 8,560,759 B1 | 10/2013 | Boyle et al. |
| 8,576,509 B1 | 11/2013 | Hogg |
| 8,576,511 B1 | 11/2013 | Coker et al. |
| 8,578,100 B1 | 11/2013 | Huynh et al. |
| 8,578,242 B1 | 11/2013 | Burton et al. |
| 8,582,223 B1 | 11/2013 | Garani et al. |
| 8,582,231 B1 | 11/2013 | Kermiche et al. |
| 8,589,773 B1 | 11/2013 | Wang et al. |
| 8,593,753 B1 | 11/2013 | Anderson |
| 8,599,512 B2 | 12/2013 | Hogg |
| 8,605,379 B1 | 12/2013 | Sun |
| 8,611,031 B1 | 12/2013 | Tan et al. |
| 8,611,032 B2 | 12/2013 | Champion et al. |
| 8,612,798 B1 | 12/2013 | Tsai |
| 8,619,383 B1 | 12/2013 | Jung et al. |
| 8,619,508 B1 | 12/2013 | Krichevsky et al. |
| 8,619,529 B1 | 12/2013 | Liew et al. |
| 8,621,115 B1 | 12/2013 | Bombet et al. |
| 8,621,133 B1 | 12/2013 | Boyle |
| 8,625,224 B1 | 1/2014 | Lin et al. |
| 8,625,225 B1 | 1/2014 | Wang |
| 8,626,463 B2 | 1/2014 | Stevens et al. |
| 8,630,052 B1 | 1/2014 | Jung et al. |
| 8,631,188 B1 | 1/2014 | Heath et al. |
| 8,635,412 B1 | 1/2014 | Wilshire |
| 8,661,193 B1 | 2/2014 | Cobos et al. |
| 8,665,547 B1 | 3/2014 | Yeo et al. |
| 8,667,248 B1 | 3/2014 | Neppalli |
| 8,670,205 B1 | 3/2014 | Malina et al. |
| 8,671,250 B2 | 3/2014 | Lee |
| 8,681,442 B2 | 3/2014 | Hogg |
| 8,681,445 B1 | 3/2014 | Kermiche et al. |
| 8,683,295 B1 | 3/2014 | Syu et al. |
| 8,687,306 B1 | 4/2014 | Coker et al. |
| 8,687,307 B1 | 4/2014 | Patton, III |
| 8,687,313 B2 | 4/2014 | Selvaraj |
| 8,693,133 B1 | 4/2014 | Lee et al. |
| 8,698,492 B1 | 4/2014 | Mak et al. |
| 8,699,171 B1 | 4/2014 | Boyle |
| 8,699,172 B1 | 4/2014 | Gunderson et al. |
| 8,711,500 B1 | 4/2014 | Fong et al. |
| 8,711,506 B1 | 4/2014 | Giovenzana et al. |
| 8,711,665 B1 | 4/2014 | Abdul Hamid |
| 8,717,694 B1 | 5/2014 | Liew et al. |
| 8,717,695 B1 | 5/2014 | Lin et al. |
| 8,730,612 B1 | 5/2014 | Haralson |
| 8,743,502 B1 | 6/2014 | Bonke et al. |
| 8,749,911 B1 | 6/2014 | Sun et al. |
| 2005/0147016 A1 * | 7/2005 | Morikawa et al. ......... 369/124.1 |
| 2009/0113702 A1 | 5/2009 | Hogg |
| 2010/0306551 A1 | 12/2010 | Meyer et al. |
| 2011/0226729 A1 | 9/2011 | Hogg |
| 2012/0159042 A1 | 6/2012 | Lott et al. |
| 2012/0275050 A1 | 11/2012 | Wilson et al. |
| 2012/0281963 A1 | 11/2012 | Krapf et al. |
| 2012/0324980 A1 | 12/2012 | Nguyen et al. |

\* cited by examiner

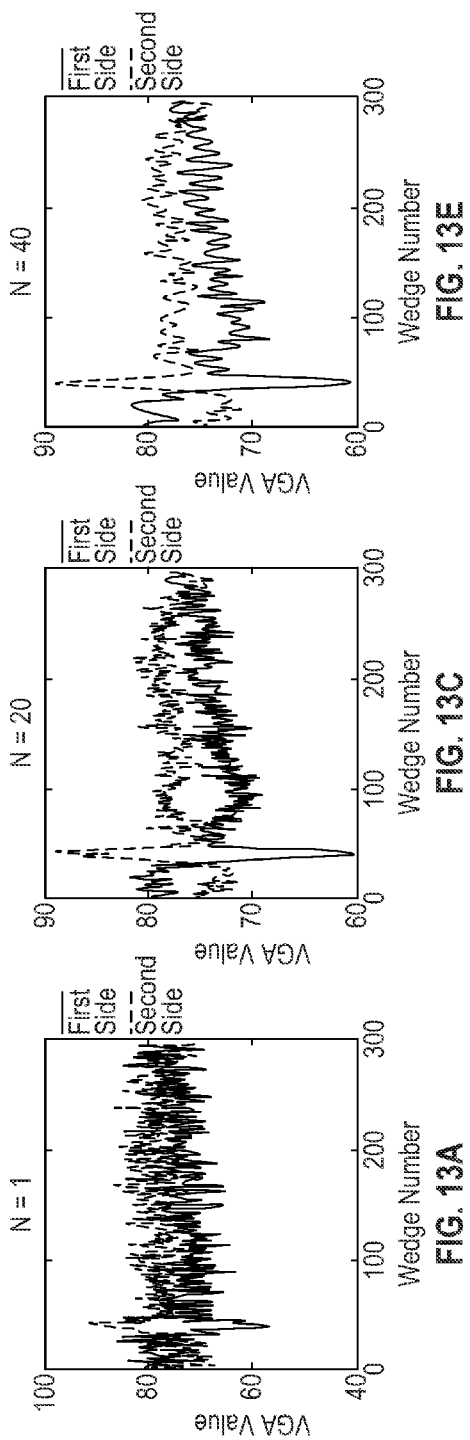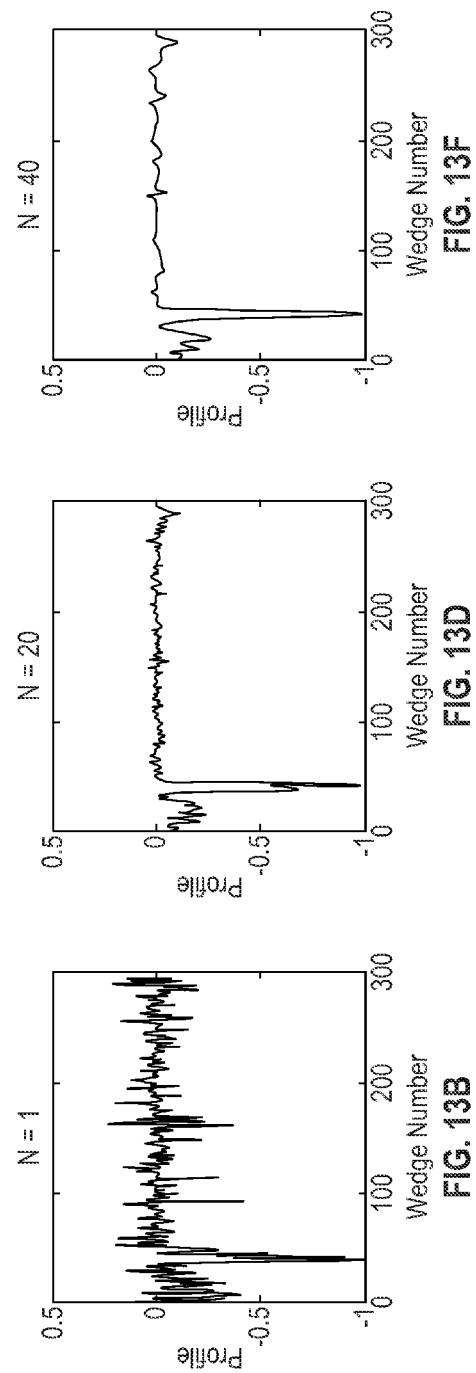

DETECTION OF DISK SURFACE IRREGULARITIES IN DATA STORAGE DEVICES

CROSS-REFERENCE TO RELATED APPLICATION(S)

This application claims the benefit of U.S. Provisional Application No. 61/920,400, filed on Dec. 23, 2013, which is hereby incorporated by reference in its entirety.

BACKGROUND

Data Storage Devices (DSDs) are often used to record data onto or to reproduce data from a storage media such as a rotating magnetic disk. In DSDs with a rotating magnetic disk, a magnetic head is typically actuated over the disk to magnetically write and read data on a surface of the disk. During normal operation, the head floats over the disk surface at an appropriate distance or "fly height" above the disk surface due to airflow between the head and the disk surface. The fly height or distance between the head and the disk surface is often only a few nanometers. As a result of this relatively small distance and the sensitivity of the head, relatively small surface irregularities on the disk can cause errors when reading or writing data.

Such disk surface irregularities may, for example, be caused as part of an assembly process of the DSD when clamping the disk to a spindle which may cause warping of the disk surface or the introduction of contaminants on the disk surface.

BRIEF DESCRIPTION OF THE DRAWINGS

The features and advantages of the embodiments of the present disclosure will become more apparent from the detailed description set forth below when taken in conjunction with the drawings. The drawings and the associated descriptions are provided to illustrate embodiments of the disclosure and not to limit the scope of what is claimed.

FIG. 13A is a graph illustrating example VGA values for a first side and a second side of a disk without VGA value averaging according to an embodiment.

FIG. 13B is a graph illustrating a profile based on the VGA values of FIG. 13A according to an embodiment.

FIG. 13C is a graph illustrating example sets of VGA values generated by averaging VGA values for groups of 20 contiguous tracks according to an embodiment.

FIG. 13D is a graph illustrating a profile based on the sets of VGA values of FIG. 13C according to an embodiment.

FIG. 13E is a graph illustrating example sets of VGA values generated by averaging VGA values for groups of 40 contiguous tracks according to an embodiment.

FIG. 13F is a graph illustrating a profile based on the sets of VGA values of FIG. 13E according to an embodiment.

DETAILED DESCRIPTION

In the following detailed description, numerous specific details are set forth to provide a full understanding of the present disclosure. It will be apparent, however, to one of ordinary skill in the art that the various embodiments disclosed may be practiced without some of these specific details. In other instances, well-known structures and techniques have not been shown in detail to avoid unnecessarily obscuring the various embodiments.

Figure 1A:
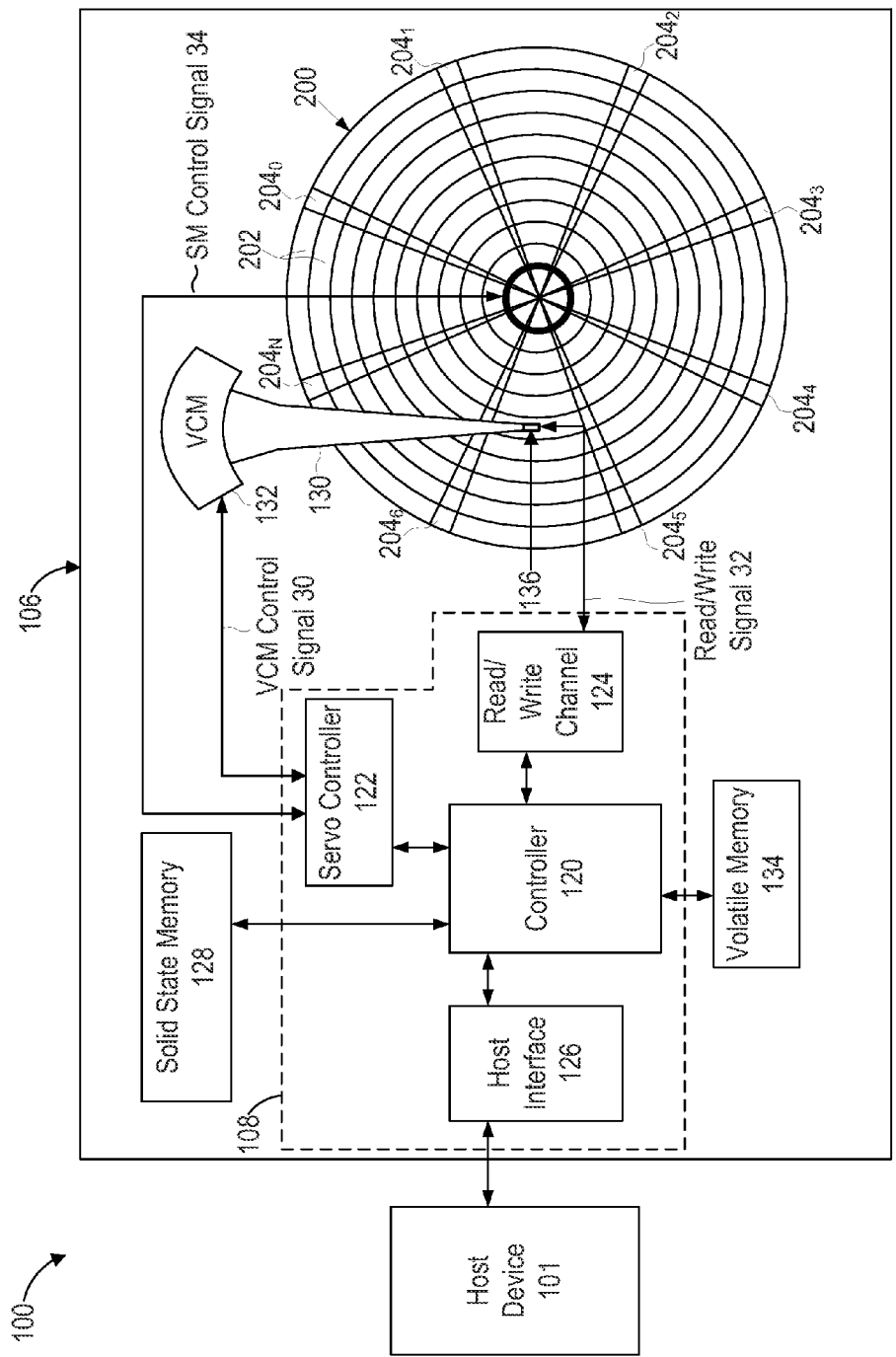
FIG. 1A is a block diagram depicting a Data Storage Device (DSD) according to an embodiment.

FIG. 1A illustrates a block diagram of DSD 106 according to an embodiment. In the example of FIG. 1A, DSD 106 is part of computer system 100 which includes host device 101 and DSD 106. Computer system 100 can be, for example, a computer system (e.g., desktop, mobile/laptop, tablet, smartphone, etc.) or other electronic device such as a digital video recorder (DVR). In this regard, computer system 100 may be a stand-alone system or part of a network, which can, for example, be a local or wide area network or the Internet.

In the example of FIG. 1A, host device 101 can interface with DSD 106 during a factory testing of DSD 106 as part of a manufacturer's quality control process. One part of the testing can include the detection of surface irregularities of rotating magnetic disks in disk pack 200 of DSD 106. As discussed above, even somewhat small disk surface irregularities such as warping of the disk or contaminants on the disk can cause significant disk surface irregularities that can cause errors when reading or writing data.

In other implementations, such as when disks are tested in the field after leaving the factory, certain portions of the disk may be "mapped out" or prevented from being used if a significant irregularity is detected. However, and as discussed below with reference to FIG. 3, conventional surface irregularity detection often leads to false indications of significant surface irregularities due to noise during the testing process, differences from one disk to another, or differences from one DSD to another. Such conventional detection processes are especially vulnerable to false indications due in part to the small scale (e.g., nanometers) involved with testing for surface irregularities. Although false indications of surface irregularities can lead to manufacturing inefficiencies, allowing for greater variation in disk surfaces may cause a significant surface irregularity to be missed that might cause problems in reading or writing data on the disk.

In view of the foregoing, the disclosed processes for detecting surface irregularities can reduce false indications of a significant disk surface irregularity that may be caused by variations from disk to disk, insignificant surface irregularities, or by noise. In addition, the disclosed processes for surface irregularity detection also generally improve the ability to detect surface irregularities that would otherwise cause problems when reading or writing data.

The disclosed surface irregularity detection processes may be performed by DSD 106 or by host device 101, or by a combination of both host device 101 and DSD 106. In addition, those of ordinary skill in the art will appreciate that computer system 100 and DSD 106 can include more or less than those elements shown in FIG. 1A and that the processes disclosed for surface irregularity detection may be implemented in other environments.

As shown in FIG. 1A, DSD 106 includes circuitry 108 which includes circuitry for controlling operation of DSD 106. In more detail, circuitry 108 includes controller 120, servo controller 122, read/write channel 124, and host interface 126.

Controller 120 can include circuitry such as one or more processors for executing instructions and can include a microcontroller, a Digital Signal Processor (DSP), an Application Specific Integrated Circuit (ASIC), a Field Programmable Gate Array (FPGA), hard-wired logic, analog circuitry and/or a combination thereof. In one implementation, controller 120 can include a System on a Chip (SoC).

Host interface 126 is configured to interface DSD 106 with host device 101 and may interface according to a standard such as, for example, PCI express (PCIe), Serial Advanced Technology Attachment (SATA), or Serial Attached SCSI (SAS). Although FIG. 1A depicts the co-location of host device 101 and DSD 106, in other embodiments the two need not be physically co-located. In such embodiments, DSD 106 may be located remotely from host device 101 and interface with host device 101 via a network interface.

Read/write channel 124 includes circuitry for encoding data to be written to disk pack 200 and for decoding data read from disk pack 200. An example of a read channel portion of read/write channel 124 is discussed in more detail below with reference to FIG. 1C.

DSD 106 also optionally includes solid state memory 128 for storing data, which stores data that can be retained across power cycles (i.e., after turning DSD 106 off and on). In this regard, DSD 106 can be considered a "hybrid drive" in that it includes multiple types of storage media. However, as will be appreciated by those of ordinary skill in the art, other embodiments may not include solid state memory 128, and may instead only include rotating magnetic disks as a non-volatile memory.

While the description herein refers to solid state memory generally, it is understood that solid state memory may comprise one or more of various types of memory devices such as flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., Single-Level Cell (SLC) memory, Multi-Level Cell (MLC) memory, or any combination thereof), NOR memory, EEPROM, Ferroelectric Memory (Fe RAM), Magnetoresistive RAM (MRAM), other discrete NVM chips, or any combination thereof.

In the example of FIG. 1A, disk pack 200 is rotated by a spindle motor (not shown). DSD 106 also includes head stack assembly (HSA) 136 connected to the distal end of actuator 130 which is rotated by Voice Coil Motor (VCM) 132 to position HSA 136 in relation to disk pack 200. Servo controller 122 includes circuitry to control the position of HSA 136 and the rotation of disk pack 200 using VCM control signal 30 and SM control signal 34, respectively.

Disk pack 200 comprises multiple disks that are radially aligned so as to rotate about the spindle motor. Each disk in disk pack 200 includes a number of radially spaced, concentric tracks 202. Each track 202 is divided into a number of sectors that are spaced circumferentially along track 202. The sectors may be used to store user data and/or other information. HSA 136 includes multiple heads each arranged to read data from and write data to a corresponding surface of a disk in disk pack 200.

Each disk also includes a plurality of angularly spaced servo wedges $204_0$-$204_N$, each of which may include embedded servo information that can be read from the disk by a head of HSA 136 to determine the position of the head over the disk. For example, each servo wedge $204_0$-$204_N$ may include a pattern of alternating magnetic transitions (servo burst), which may be read from the disk by the head and processed by circuitry 108 to estimate the position of the head relative to the disk. Each servo wedge $204_0$-$204_N$ can indicate a wedge number and the angular spacing between servo wedges $204_0$-$204_N$ may be uniform, as shown in the example of FIG. 1A.

In operation, host interface 126 receives commands from host device 101 via host interface 126 for reading data from and writing data to non-volatile memory such as solid state memory 128 or disk pack 200. In response to a write command from host device 101, controller 120 may buffer the data to be written for the write command in volatile memory 134.

For data to be written to disk pack 200, read/write channel 124 encodes the buffered data into write signal 32 which is provided to HSA 136 for magnetically writing data to a disk surface of disk pack 200.

In response to a read command for data stored on a disk surface of disk pack 200, controller 120 positions HSA 136 via servo controller 122 to magnetically read the data stored on a surface of disk pack 200. HSA 136 sends the read data as read signal 32 to read/write channel 124 for decoding and the data is buffered in volatile memory 134 for transferring to host device 101 via host interface 126.

Figure 1B:
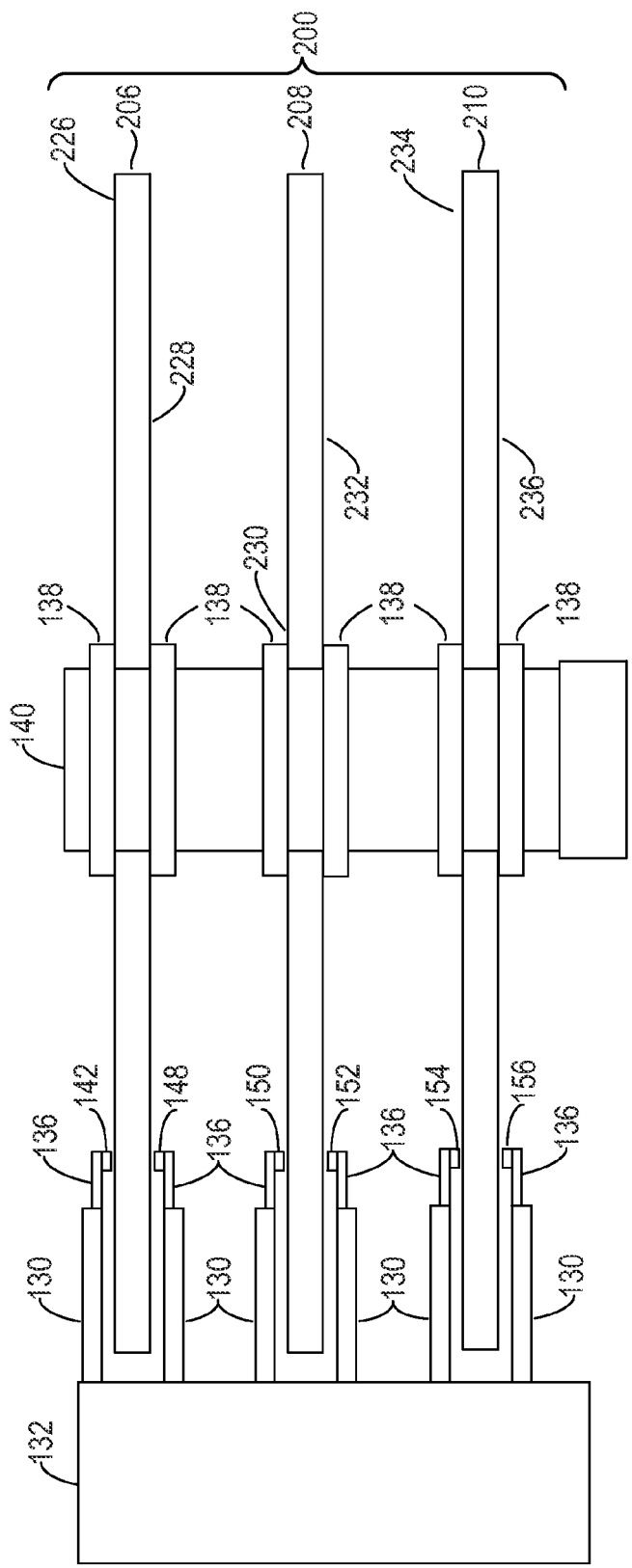
FIG. 1B depicts a side view of a disk pack of the DSD of FIG. 1A according to an embodiment.

FIG. 1B depicts a side view of disk pack 200 according to an embodiment. As shown in FIG. 1B, disk pack 200 includes disks 206, 208, and 210 arranged in a stacked configuration. Each of the disks in disk pack 200 includes a first surface for storing data and a second surface for storing data that is opposite the first surface. In particular, disk 206 includes first surface 226 and second surface 228, disk 208 includes first surface 230 and second surface 232, and disk 210 includes first surface 234 and second surface 236.

Each surface 226, 228, 230, 232, 234 and 236 can be read or written by a respective head 142, 148, 150, 152, 154, or 156 in HSA 136. In addition, each of disks 206, 208 and 210 are clamped to spindle 140 via disk clamps 138. When disks are clamped to spindle 140 during assembly of DSD 106 care must be taken to avoid warping or bending the disks by applying too much pressure or by introducing particles that may become trapped between disk clamp 138 and a disk. This can particularly be a problem with disks such as aluminum disks that may deform more easily than other materials.

Although disks 206, 208 and 210 may be formed of the same material, they may have different surface roughness due to variations in the disk material and disk manufacture. In some embodiments, the surface irregularity detection disclosed herein tailors its detection for a particular disk by setting a threshold for surface irregularities which may or may not be the same as thresholds used to detect surface irregularities for another disk in the same DSD.

As discussed in more detail below, surface irregularities can be detected for a particular disk by generating a first set of Variable Gain Amplifier (VGA) values related to reading data from a first surface of the disk and generating a second set of VGA values related to reading data from a second surface of the disk. Although other factors may affect the VGA values, a set of VGA values on the whole generally corresponds to a distance or fly height between a head and a surface of the disk while reading data. A profile for the disk is then determined using the first set and the second set of VGA values and the profile is compared to at least one threshold to detect a surface irregularity.

Figure 1C:
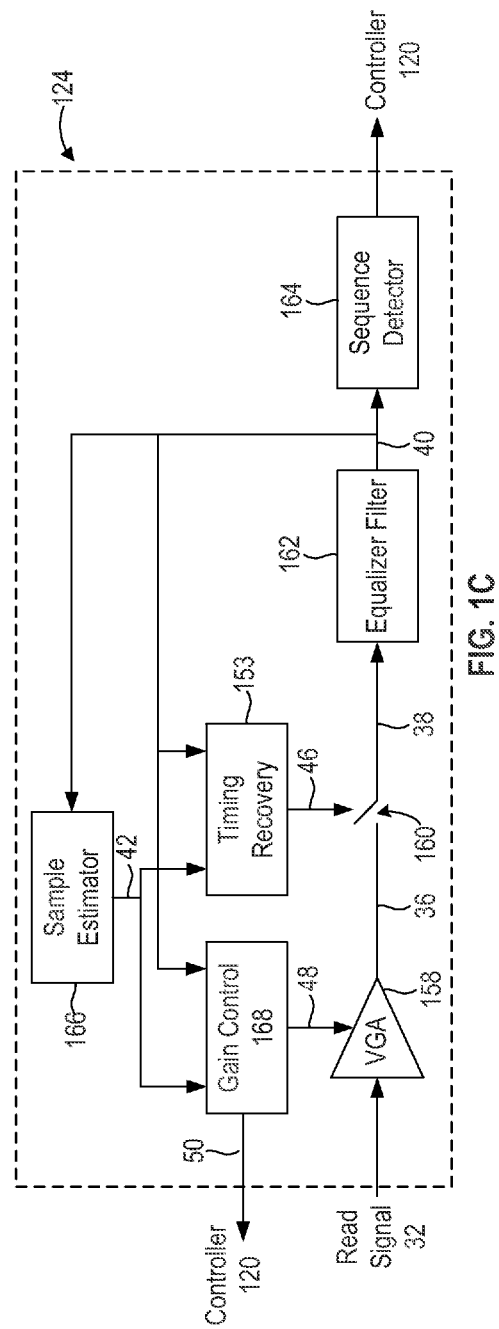
FIG. 1C is a block diagram depicting components of a read/write channel of the DSD of FIG. 1A according to an embodiment.

In the embodiment of FIG. 1C, VGA values are generated that relate to reading data from a surface of a disk. In implementations where the data is read from servo wedges such as servo wedges $204_0$-$204_N$, the VGA values can include Servo VGA values or SVGA values that relate to reading data from the servo wedges. In some implementations, all of the VGA values can be SVGA values.

As shown in FIG. 1C, a read portion of read/write channel 124 of DSD 106 includes VGA 158 for amplifying read signal 32 from a head in HSA 136 (e.g., head 142, 148, 150, 152, 154, or 156). As discussed in more detail below, VGA values for both sides of a disk can be used to determine a profile for the disk.

In FIG. 1C, VGA 158 uses VGA setting 48 as a gain to amplify read signal 32 to a target amplitude. VGA setting 48 can therefore generally indicate the distance between the head and the disk surface since a larger gain indicates a weaker read signal 32 and a greater distance between the head and the disk surface. Similarly, a smaller gain can generally indicate a stronger read signal 32 and a smaller distance between the head and the disk surface.

As shown in the example of FIG. 1C, read/write channel 124 further includes sampling device 160 for sampling the amplified read signal 36 to generate a sequence of read signal sample values 38. An equalizer filter 162 shapes the read signal sample values 38 according to a desired response (e.g., a partial response or PR) to generate equalized sample vales 40. The equalized sample values 40 are processed by a sequence detector 164 (e.g., a Viterbi detector) to detect an estimated bit sequence representing the data recorded on a disk in disk pack 200.

Read/write channel 124 also includes sample estimator 166 (e.g., a slicer) for estimating target sample value 42 from an equalized sample value 40. Target sample value 42 and equalized sample value 40 are processed by gain control 168 to generate VGA gain setting 48 for adjusting the gain of VGA 158. As shown in FIG. 1C, gain control 168 also provides VGA value 50 to controller 120 which can be the same value as VGA setting 48 or a different value such as a gain error used in determining VGA setting 48 as described below with reference to FIG. 2.

Figure 2:
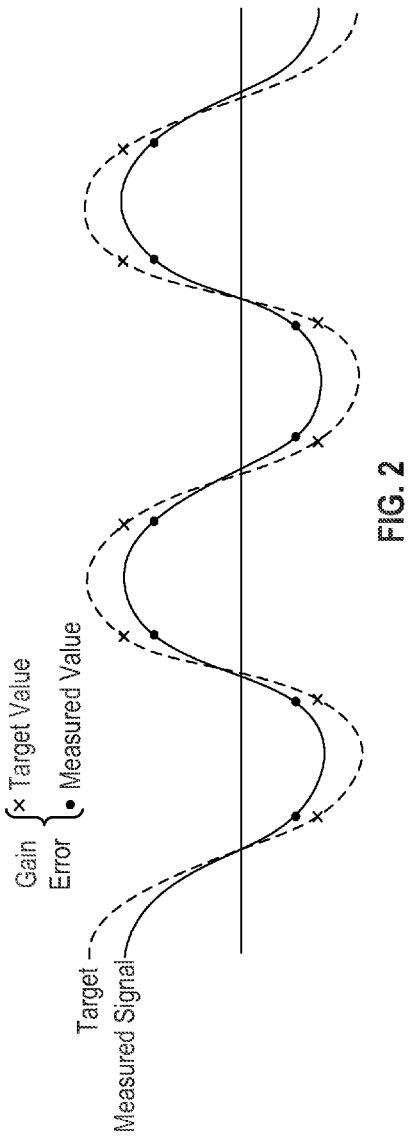
FIG. 2 depicts an example gain error used for determining a Variable Gain Amplifier (VGA) setting according to an embodiment.

Operation of gain control 168 is further described by FIG. 2 which shows a substantially sinusoidal signal for an example measured read signal 32 generated by reading data written in a 2T pattern on a disk in disk pack 200. The solid circles represent measured amplified read signal samples and the "x"s represent target sample values corresponding to a target amplitude for amplified read signal 36. The resulting gain error is used to adjust VGA setting 48 and therefore the gain of VGA 158. In the example of FIG. 2, the gain error will increase VGA setting 48 so as to increase the amplitude of amplified read signal 36 toward the target amplified read signal.

As described in greater detail below with reference to FIG. 4B, surface irregularities will cause the fly height to increase on one side of a disk and decrease the fly height on the opposite side of the disk. As noted above, VGA values that can generally correspond to the fly height on each side of the disk can be generated by monitoring the VGA gain error or VGA gain setting 48.

Any suitable circuitry may be employed to implement the components of read/write channel 124 shown in FIG. 1C. In one embodiment, the components are implemented using discrete-time circuitry, and in an alternative embodiment, the components are implemented in firmware executed by a microprocessor. As described herein, the circuitry of read/write channel 124 is grouped together with circuitry 108. However, the components of read/write channel 124 need not be unitary, and may be located throughout DSD 106, as understood by those of ordinary skill in the art.

Read/write channel 124 may also include additional components not shown, such as an analog low pass filter for filtering the read signal prior to sampling. Read/write channel 124 may also be arranged into any suitable configuration. For example, sample estimator 166 may operate on read signal sample values 38 input into equalizer filter 162. In another embodiment, timing recovery 153 may be implemented using a suitable interpolated timing recovery algorithm rather than a synchronous sampling algorithm. In yet another embodiment, sequence detector 164 may generate target sample values 42 corresponding to read signal sample values 40.

Figure 3:
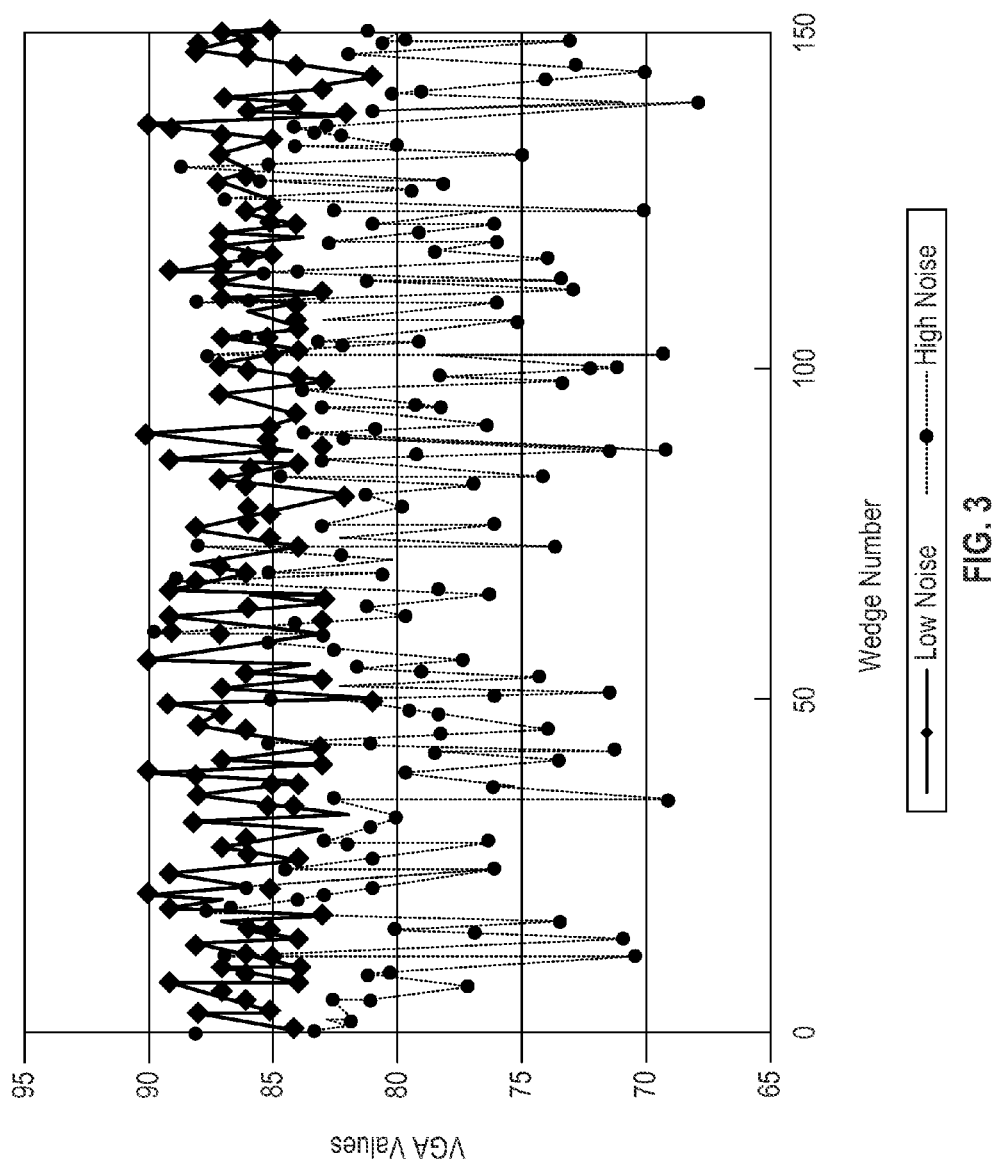
FIG. 3 illustrates two different sets of VGA values under different noise conditions according to an embodiment.

FIG. 3 illustrates two different sets of VGA values according to an embodiment to demonstrate the effect of background noise in detecting surface irregularities. Noise can be caused, for example, by vibration of DSD 106 or by signal interference from circuitry of DSD 106. The first set of VGA values depicted with a diamond were obtained during a low noise condition while the second set of VGA values depicted with a circle were obtained during a high noise condition.

As shown in FIG. 3, the high noise values vary more than the low noise values. This increased variance in VGA values may lead to false indications of surface irregularities. The following processes for detecting surface irregularities can ordinarily reduce such false indications.

Figure 4A:
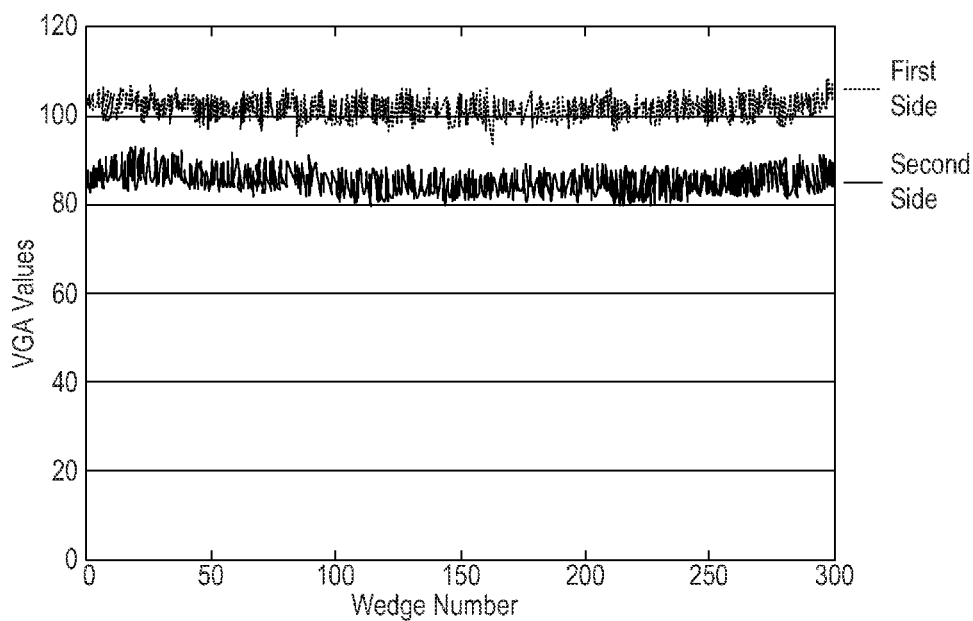
FIG. 4A is a graph illustrating example VGA values for a first side and a second side of a disk without a significant surface irregularity according to an embodiment.

FIG. 4A is a graph illustrating VGA values for a first side and a second side of a disk without a significant surface irregularity according to an embodiment. The VGA values in FIG. 4A are represented as two series or sets of VGA values with a VGA value for each wedge on the surface of the disk. As shown in FIG. 4A, the first and second surfaces each include 300 wedges and the VGA values generally vary from wedge to wedge. In addition, the ranges of VGA values differ from the first side of the disk to the second side of the disk which can result from various factors such as the orientation of the head with respect to being on a top surface or a bottom surface of the disk.

Figure 4B:
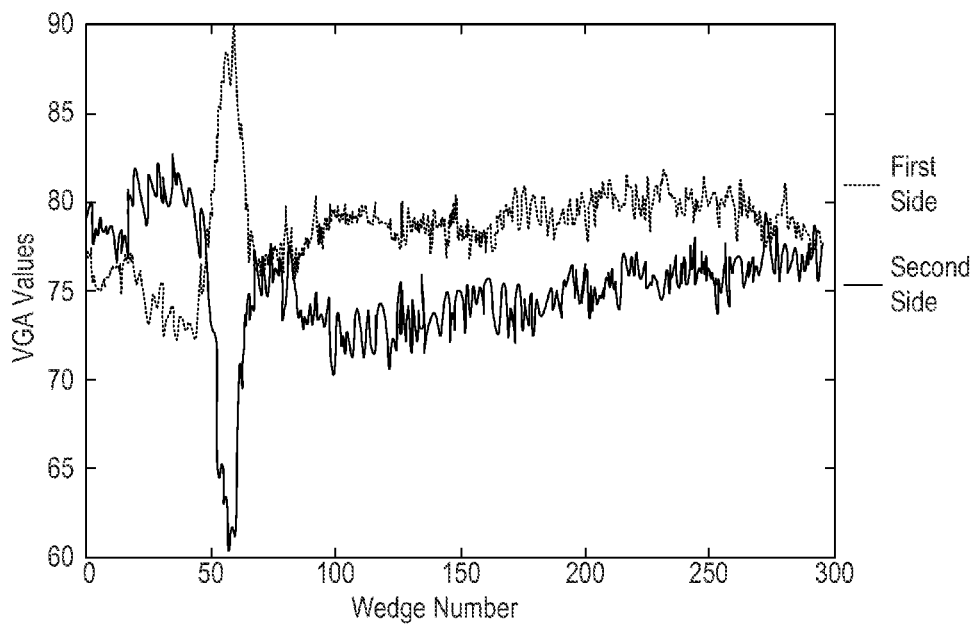
FIG. 4B is a graph illustrating example VGA values for a first side and a second side of a disk with a significant surface irregularity according to an embodiment.

In contrast to the graph of FIG. 4A, the graph of FIG. 4B depicts two sets of VGA values for a disk with a significant surface irregularity that can cause errors when reading or writing data. As shown in FIG. 4B, the VGA values for the first side increase sharply at approximately wedge number 50 while the VGA values for the second side decrease sharply at approximately wedge number 50. Although the large variance between the two sets of VGA values can indicate a surface irregularity, additional processing of the sets of VGA values can be performed to further reduce false indications and to improve the detection of surface irregularities.

Figure 5:
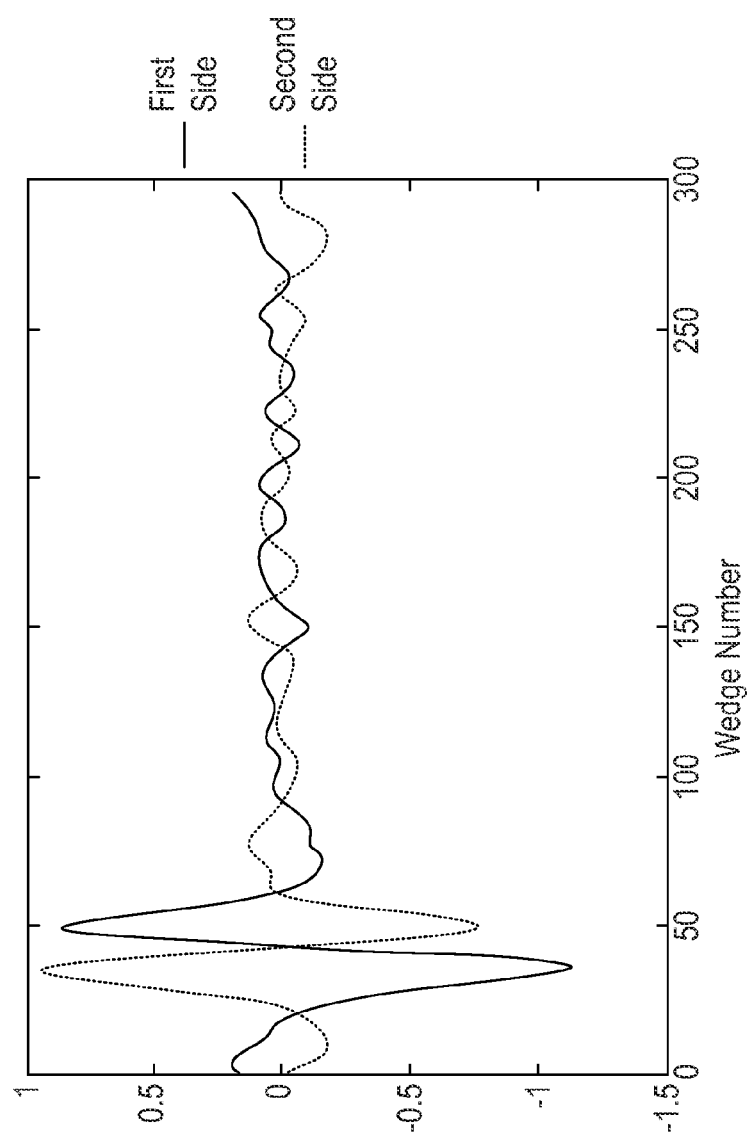
FIG. 5 is a graph of the VGA values of FIG. 4B after filtering according to an embodiment.

In one embodiment, the sets of VGA values can be filtered to further lessen the effect of noise on the signals. FIG. 5 depicts the sets of VGA values of FIG. 4B after filtering according to an embodiment. As shown in FIG. 5, the filtered signal for each set is smoother and can be rescaled. The filtering can be performed by applying a Gaussian filter or other noise reducing filter as discussed below in more detail with reference to FIGS. 8A and 8B. After filtering the sets of VGA values, a profile for the disk can be determined for detection of surface irregularities.

Figure 6:
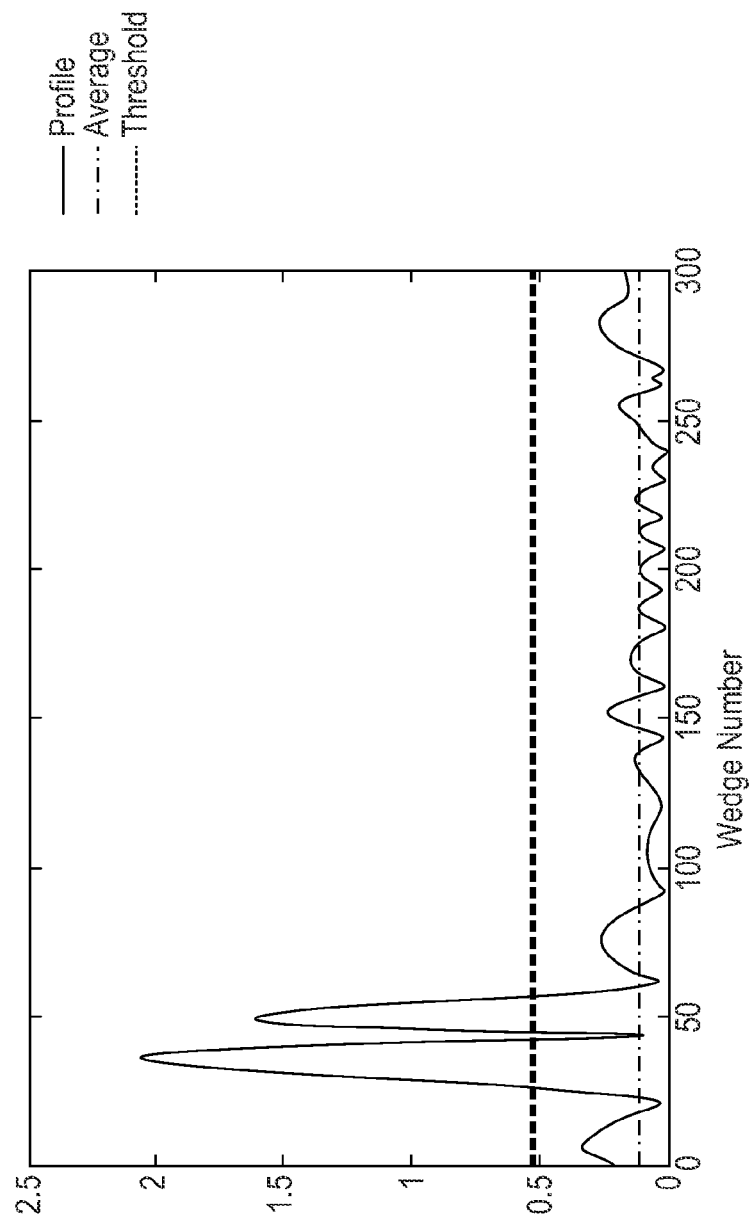
FIG. 6 is a graph comparing a profile based on the VGA values of FIG. 5 with a threshold according to an embodiment.

In the embodiment of FIG. 6, a profile is determined by taking the absolute value of the difference between the first set of VGA values and the second set of VGA values after the filtering in FIG. 5. In addition, and as shown in FIG. 6, a threshold for the disk is set based on the profile. In the example of FIG. 6, the threshold is set by sorting the values from the profile for each wedge and excluding the highest or outermost values. In one implementation, the highest 10% of the profile values are excluded. The remaining profile values are then averaged for the remaining wedges. This average is shown in FIG. 6 at approximately 0.1. An adaptive threshold for the disk is set by multiplying the average by a predetermined value. In the example of FIG. 6, the threshold is calculated by multiplying the average by 5. The threshold is shown in FIG. 6 as the bold dashed line at approximately 0.5.

The profile is then compared to the threshold. As shown in FIG. 6, the profile exceeds the threshold at approximately wedge number 25 and again at approximately wedge number 45. In some embodiments, the disk can therefore be considered to have a surface irregularity since the profile exceeds the threshold. In other embodiments, a surface irregularity is detected if the number of profile values outside the threshold exceed a predetermined number.

Figure 7:
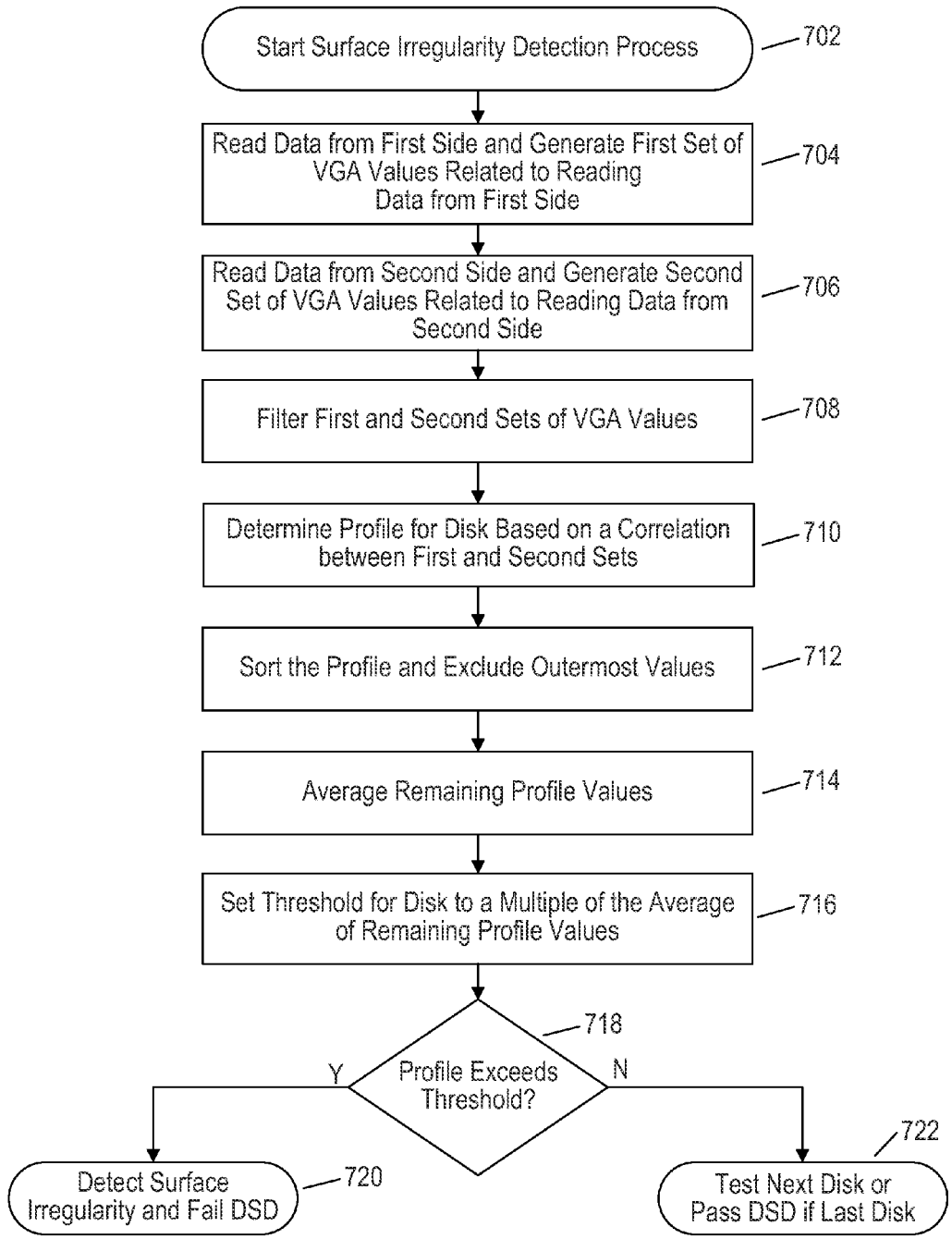
FIG. 7 is a flowchart for a surface irregularity detection process according to an embodiment.

FIG. 7 is a flowchart for a surface irregularity detection process that can be performed by circuitry 108 of DSD 106 according to an embodiment. In other embodiments, the process of FIG. 7 or portions of the process may be performed by host device 101. The surface irregularity detection process begins in block 702. As noted above, the detection process may be part of a factory quality control process or may be performed in the field after the DSD has left the factory. The initiation of the detection process may be in response to an input received from host device 101 via host interface 126 or may be self-initiated by firmware of DSD 106 during a first startup of DSD 106.

In block 704, circuitry 108 controls a first head of HSA 136 to read data from a first side of a first disk (e.g., surface 226 of disk 206). The data read in block 704 may have been previously written by the first head as test data or as part of servo wedges $204_0$-$204_N$. The data read in block 704 can be from an inner diameter of the disk since disk surface irregularities are typically more pronounced at an inner diameter than at an outer diameter. In other implementations, the first head may read data from other radial locations on the first surface.

Circuitry 108 also generates a first set of VGA values related to the reading of data from the first side using the first head. As discussed above with reference to FIG. 1C, the VGA values can include a VGA setting (e.g., VGA setting 48) or a gain error used to determine the VGA setting. In implementations where the data is read from servo wedges such as servo wedges $204_0$-$204_N$, the VGA values include SVGA values.

In block 706, circuitry 108 controls a second head of HSA 136 to read data from a second side of the first disk (e.g., surface 228 of disk 206). As with the first side of the disk, the data read from the second side may have been previously written by the second head as test data or as part of servo wedges $204_0$-$204_N$. The second head may also read the data from an inner diameter of the disk since surface irregularities are typically more pronounced at an inner diameter than at an outer diameter. Circuitry 108 also generates a second set of VGA values related to reading data from the second side. As noted above, when the data is read from servo wedges on the disk, the VGA values can include SVGA values.

In some embodiments, blocks 704 and 706 may be performed concurrently such that both the first and second surfaces are read at approximately the same time with associated VGA values for each surface being generated at approximately the same time.

In block 708, the first and second sets of VGA values are filtered to smooth the signals for the sets of VGA values and reduce noise. As noted above with reference to FIG. 5, a Gaussian or other noise reducing filter may be used. Block 708 may be omitted in other embodiments.

In block 710, controller 120 of circuitry 710 determines a profile for the disk based on a correlation between the first and second sets. In one embodiment, the profile can be determined by taking the absolute value of the difference between the first and second sets. In other embodiments, the profile can be determined by multiplying the first and second sets or by multiplying the first and second sets after filtering each set.

Blocks 712 to 716 are performed to determine a threshold for the disk. In block 712, profile values for the different wedges of the first and second surfaces are sorted and the outermost profile values are excluded. In one example, the highest 10% of profile values are excluded. Although block 712 generally helps to reduce instances of false indications of a surface irregularity, this block can be omitted in other embodiments.

In block 714, controller 120 averages the remaining values of the profile and a threshold is set as a multiple of the average in block 716. The greater the multiple used in setting the threshold, the less likely false indications are likely to occur. However, setting the threshold too high may allow smaller surface irregularities to go undetected. In one implementation, controller 120 sets the threshold as five times the average. Other multiples including non-integer values may also be used.

In block 718, controller 120 determines whether the profile determined in block 710 exceeds the threshold. If so, controller 120 detects a surface irregularity and fails the DSD in block 720. In this regard, controller 120 may send a failure notification to host device 101 indicating that a surface irregularity has been detected for a disk in DSD 106.

If it is determined in block 718 that the profile does not exceed the threshold, circuitry 108 in block 722 proceeds to testing a next disk in DSD 106 if there are untested disks remaining. If there are no other disks to test in DSD 106, controller 120 may indicate that DSD 106 has passed a surface irregularity test by sending a notification to host device 101.

In other embodiments, multiple disks may be tested at the same time rather than sequentially testing each disk.

By setting an adaptive threshold tailored to each disk, it is ordinarily possible to reduce false indications of a disk surface irregularity that may be caused by variations from disk to disk, insignificant surface irregularities, or by noise. In addition, the surface irregularity detection process of FIG. 7 also generally improves the ability to detect surface irregularities that would otherwise cause problems reading or writing data.

Figure 8A:
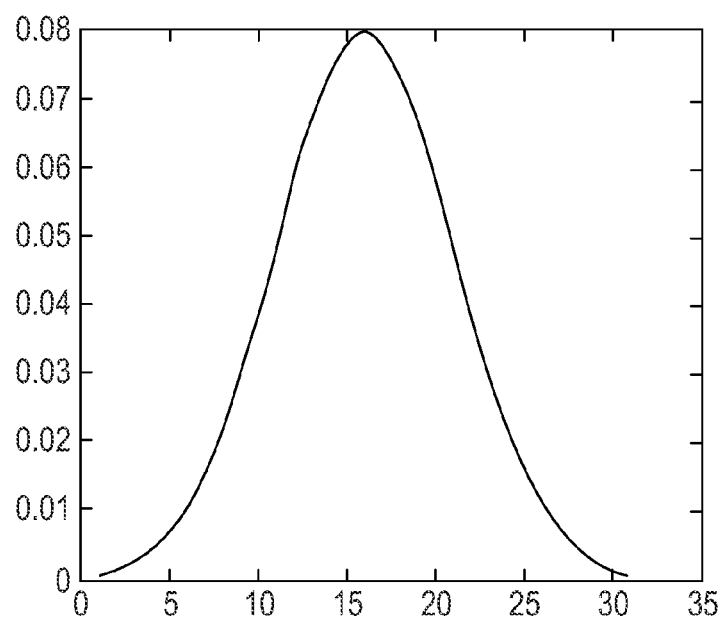
FIG. 8A depicts an example response for a Gaussian filter according to an embodiment.

FIG. 8A depicts an example response for a Gaussian filter which can be used in block 708 of FIG. 7 according to an embodiment. The response of the Gaussian filter of FIG. 8A can generally be represented as:

$$g(x) = \frac{1}{\sqrt{2\pi\,\sigma^2}} e^{-\frac{x^2}{2\sigma^2}} \qquad \text{Eq. 1}$$

where σ is a parameter to control the width of the filter and x is a spatial index (e.g., wedge number).

A Gaussian filter can smooth the sets of VGA values since the filtered value at each wedge number is equal to the weighted average of the neighboring VGA values. Implementations of a Gaussian filter can be similar to a time-based filter in that such implementations generally do not require as much memory as using a frequency-based filter which may require storing an entire signal for the set of VGA values.

Figure 8B:
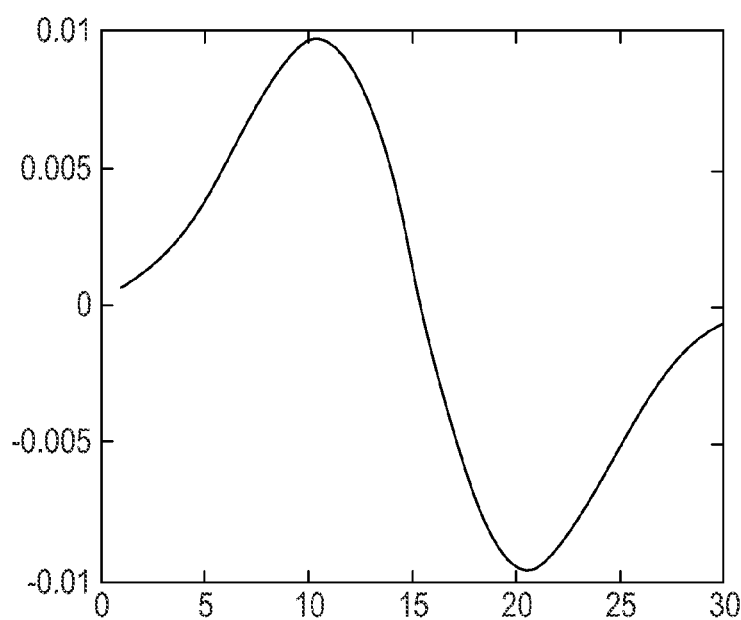
FIG. 8B depicts an example response for a differential Gaussian filter according to an embodiment.

FIG. 8B depicts an example response for a differential Gaussian filter according to an embodiment. Instead of using the Gaussian filter of FIG. 8A, some embodiments can use a differential Gaussian filter to smooth noisy sets of VGA values.

The response of the differential Gaussian filter of FIG. 8B can generally be represented as:

$$\frac{\partial g(x)}{\partial x} = -\frac{1}{\sqrt{2\pi\,\sigma^2}} x e^{-\frac{x^2}{2\sigma^2}} \qquad \text{Eq. 2}$$

where, as with Eq. 1, σ is a parameter to control the width of the filter and x is a spatial index (e.g., wedge number).

The differential Gaussian filter can smooth the sets of VGA values while allowing for more robust detection of changes in the sets by using both upper and lower values. In addition, the differential Gaussian filter is more robust to noise than other derivative computations and includes flexibility to adjust the smoothing of the sets by controlling the width of the filter (i.e., σ).

In one embodiment using a differential Gaussian filter, controller 120 may determine whether there are surface irregularities by counting the number of wedges with filtered VGA values that fall outside of an upper threshold and a lower threshold. In other words, both an upper threshold and a lower threshold may be set for a profile including the filtered first and second sets. In such embodiments, controller 120 may determine that a surface irregularity exists if the number of VGA values in the filtered first and second sets exceeds a predetermined number.

In other embodiments, controller 120 may determine whether there is a significant surface irregularity by determining whether a profile for the disk exceeds a threshold, where the profile is based on the multiplication of the filtered first and second sets of VGA values.

Figure 9A:
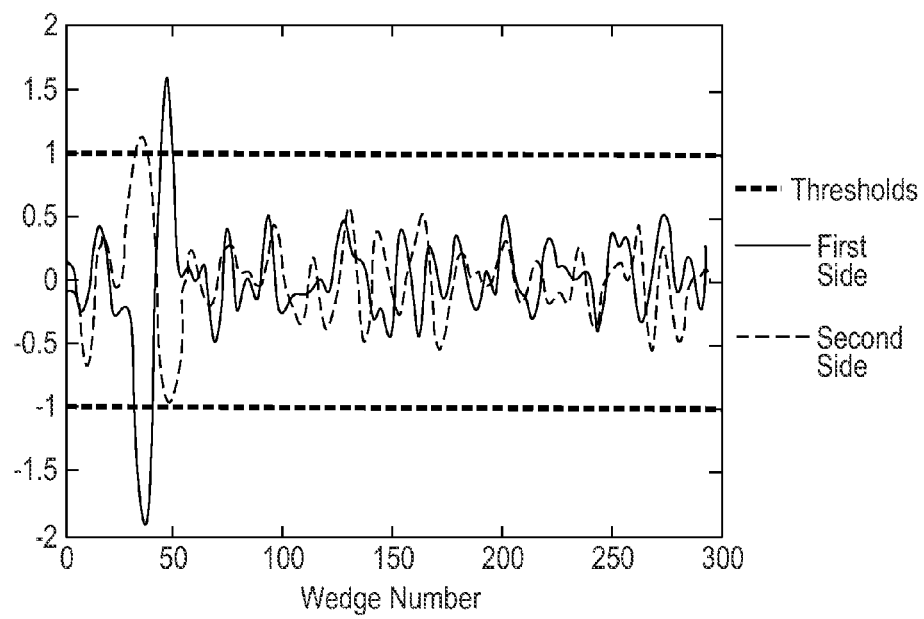
FIG. 9A is a graph depicting example VGA values for a first side and a second side of a disk after filtering using a differential Gaussian filter according to an embodiment.

FIG. 9A is a graph depicting example sets of VGA values for a first side and a second side of a disk after filtering using a differential Gaussian filter according to an embodiment to provide a profile for the disk. The first and second sets in FIG. 9A have been smoothed out to reduce the effect of noise in the signals while representing the sets with positive and negative VGA values to allow for more robust detection of significant changes in the sets. In one embodiment, an upper threshold and a lower threshold are set at 1 and −1 such that controller 120 detects a surface irregularity if the number of wedges in the filtered first and second sets (i.e., the profile in this embodiment) with values outside of the thresholds exceeds a predetermined number. In other embodiments, controller 120 may detect a surface irregularity if the profile falls outside the upper and lower thresholds.

In other embodiments, controller 120 may determine a profile for the disk by multiplying the filtered sets of VGA values. Such an embodiment is shown in FIG. 9B which depicts a profile determined by multiplying the absolute values of the signals in FIG. 9A.

Figure 9B:
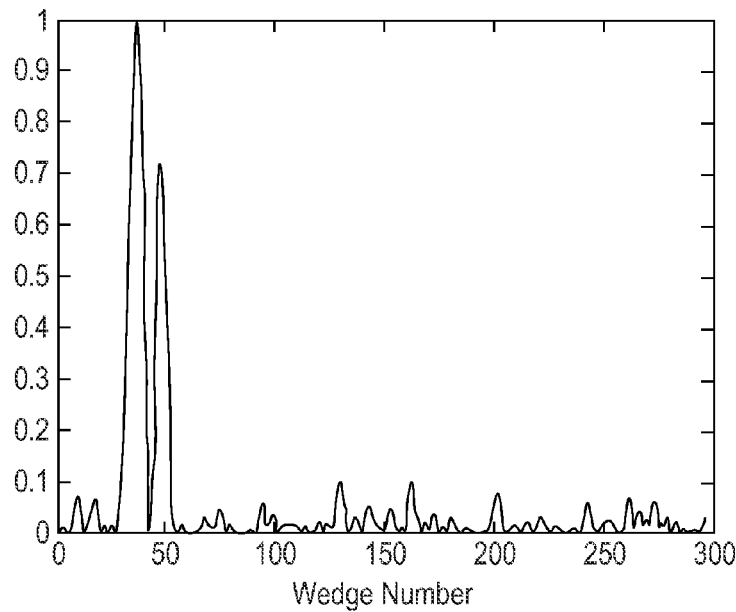
FIG. 9B is a graph depicting a profile based on the VGA values of FIG. 9A according to an embodiment.
Figure 9C:
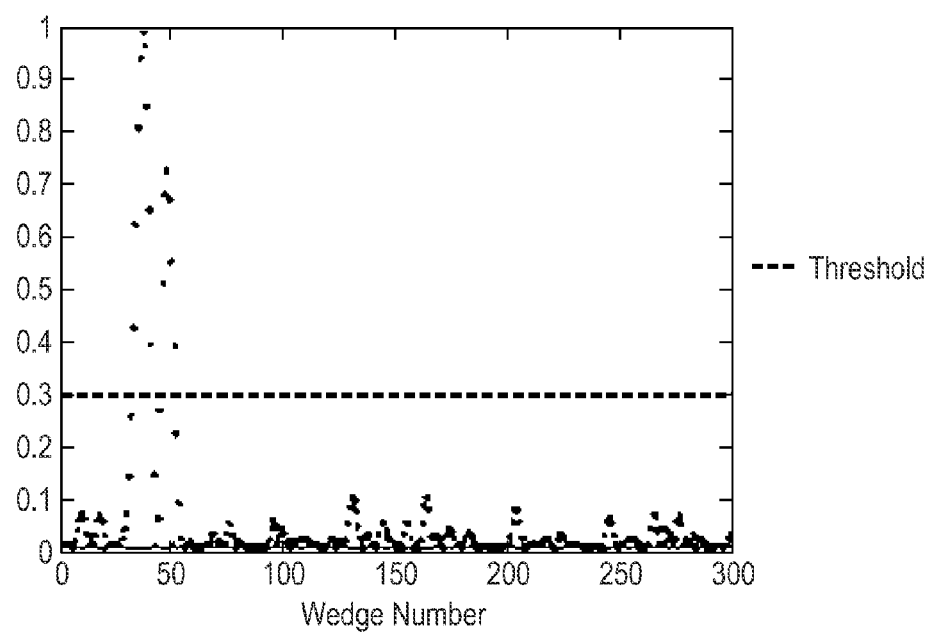
FIG. 9C is a graph depicting profile values from the profile of FIG. 9B according to an embodiment.

The profile values of FIG. 9B are shown for each wedge in FIG. 9C according to an embodiment. As shown in FIG. 9C, a threshold of 0.3 has been set for the profile values. Controller 120 may then determine whether the number of profile values exceeding the threshold in FIG. 9C is greater than a predetermined number of profile values. If so, controller 120 can determine that there is a surface irregularity for the disk.

Figure 10:
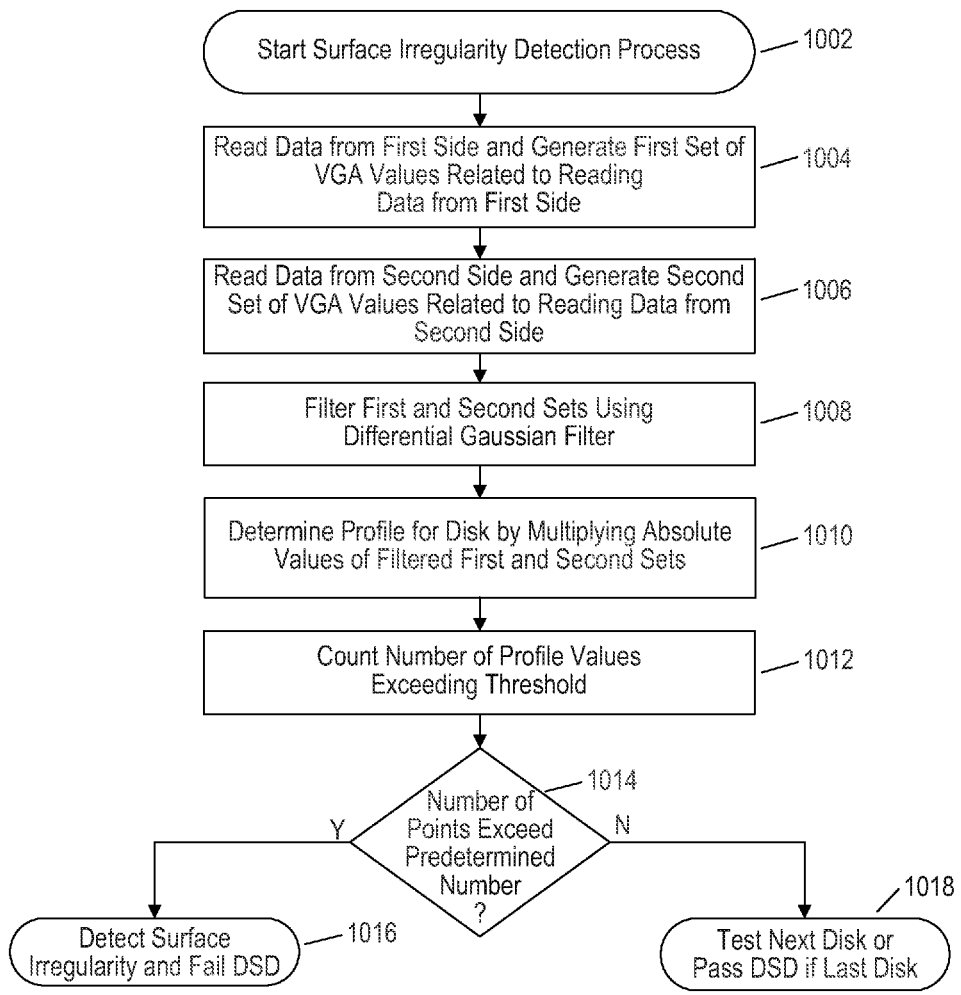
FIG. 10 is a flowchart for a surface irregularity detection process according to an embodiment using a differential Gaussian filter.

An example of such a surface irregularity detection process is provided in the flowchart of FIG. 10, which can be performed by circuitry 108 of DSD 106 according to an embodiment. In other embodiments, the process of FIG. 10 or portions of the process may be performed by host device 101. As noted above, the detection process may be part of a factory quality control process or may be performed in the field after the DSD has left the factory. The initiation of the detection process may be in response to an input received from host device 101 via host interface 126 or may be self-initiated by firmware of DSD 106 during a first startup of DSD 106.

In FIG. 10, an understanding of blocks 1002 to 1006 can be obtained with reference to the above description for blocks 702 to 706, which generally correspond to blocks 1002 to 1006.

In block 1008, controller 120 filters the first and second sets of VGA values (e.g., SVGA values) using a differential Gaussian filter such as a filter having the response depicted in FIG. 8B.

In block 1010, controller 120 determines a profile for the disk by multiplying the absolute values of the filtered first and second sets of VGA values. In other embodiments, controller 120 may instead use the filtered first and second sets as a profile.

In block 1012, controller 120 counts the number of profile values in the profile that exceed a threshold. In other embodiments, controller 120 in block 1012 may count the number of profile values that are outside of an upper threshold and a lower threshold (e.g., as in the example of FIG. 9A). The threshold or thresholds in block 1012 may be fixed values or can be adaptively set based on the profile as in blocks 712 to 716 of FIG. 7.

If it is determined by controller 120 in block 1014 that the number of profile values exceeds a predetermined number, controller 120 detects that there is a surface irregularity and fails the DSD in block 1016. In this regard, controller 120 may send a failure notification to host device 101 indicating that a surface irregularity has been detected for a disk in DSD 106.

If it is determined by controller 120 in block 1014 that the number of profile values does not exceed the predetermined number, circuitry 108 in block 1018 proceeds to testing a next disk in DSD 106 if there are untested disks remaining. If there are no other disks to test in DSD 106, controller 120 may indicate that DSD 106 has passed a surface irregularity test by sending a notification to host device 101.

In other embodiments, multiple disks may be tested at the same time rather than sequentially testing each disk.

Figure 11A:
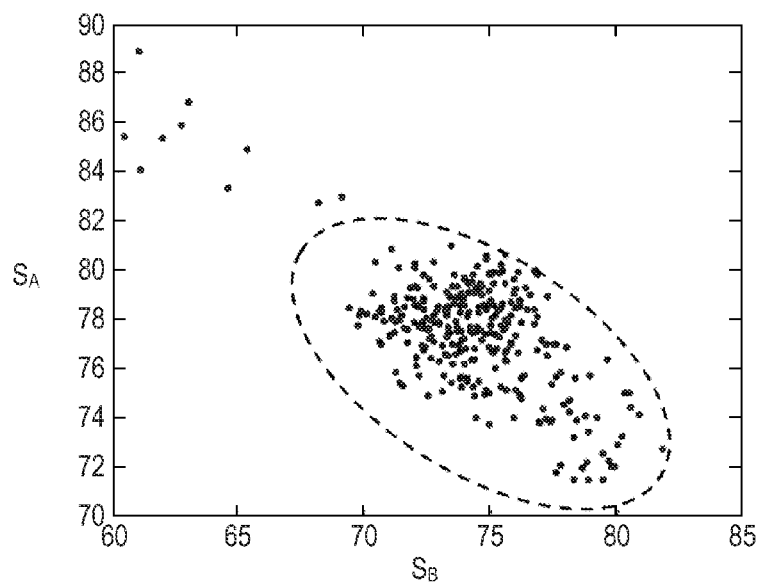
FIG. 11A is a graph illustrating a distribution of VGA values according to an embodiment.

FIG. 11A is a graph illustrating a distribution for the first and second sets of VGA values according to an embodiment. The distribution of VGA values in FIG. 11A can be represented as complex data with:

$$S(x)=S_A(x)+iS_B(x) \quad \text{Eq. 3}$$

where $S_A(x)$ are VGA values for the first set from the first side of a disk and $S_B(x)$ are VGA values for the second set from the second side of the disk. In this regard, the first set and the second set of VGA values in the distribution $S(x)$ are correlated in the distribution by a radial location on the disk (e.g., a wedge number). In other embodiments, the distribution of VGA values may be represented as:

$$S(x)=S^2_A(x)+S^2_B(x) \quad \text{Eq. 4}$$

with $S_A(x)$ and $S_B(x)$ being the VGA values from the first and second sets, respectively. The distribution $S(x)$ correlates the VGA values for the first and second sets by their associated radial locations on the disk.

As shown in FIG. 11A, the value of $S(x)$ at a surface irregularity is much higher than at the majority of the other locations shown inside the dashed oval.

Figure 11B:
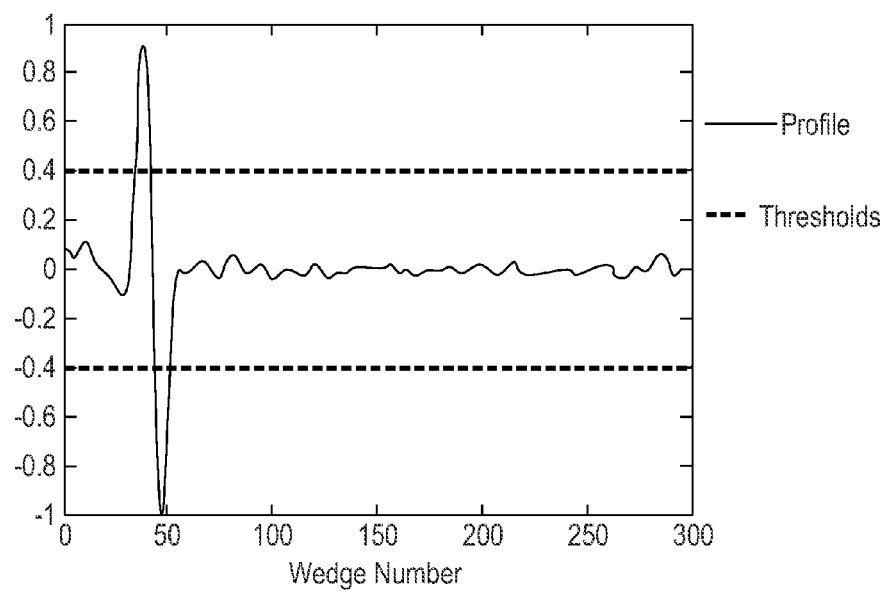
FIG. 11B is a graph comparing a profile based on the distribution of VGA values in FIG. 11A with upper and lower thresholds according to an embodiment.

The distribution of VGA values from FIG. 11A can be filtered using, for example, a differential Gaussian filter to provide a profile as depicted in FIG. 11B according to an embodiment. Using the response of Eq. 2 above, the profile of FIG. 11B provides positive and negative peaks as shown just before wedge number 50. Upper and lower thresholds can be used to detect a surface irregularity. In the embodiment of FIG. 11B, upper and lower thresholds are set at 0.4 and –0.4. In some embodiments, controller 120, may detect a surface irregularity if the profile exceeds both the upper and lower thresholds.

Figure 11C:
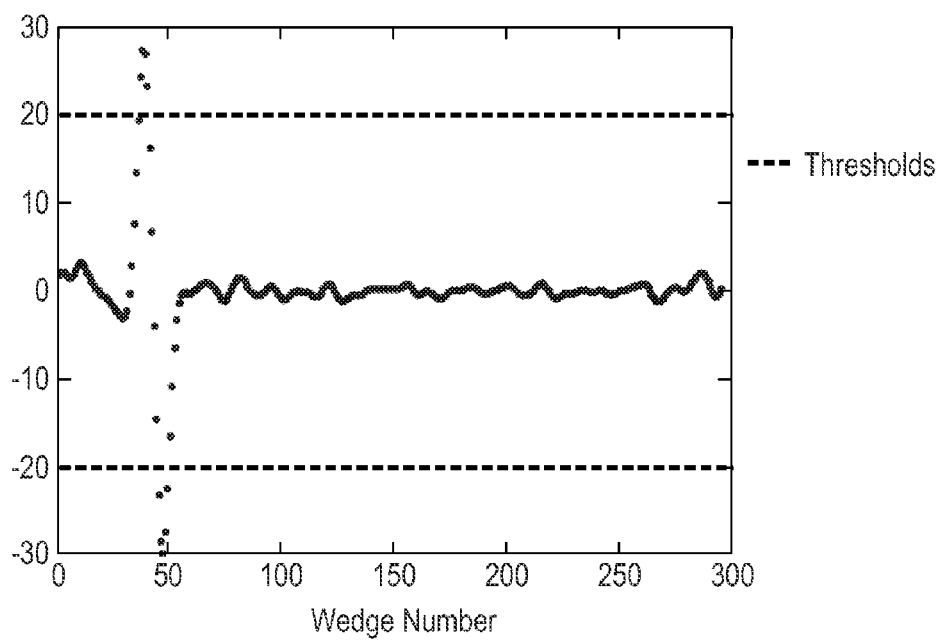
FIG. 11C is a graph depicting a distribution of profile values from the profile of FIG. 11B according to an embodiment.

In the embodiment of FIG. 11C, controller 120 counts the number of profile values based on the profile of FIG. 11B that fall outside of the upper and lower thresholds. As shown in FIG. 11C, controller 120 may rescale the profile of FIG. 11B and use different thresholds when counting the number of profile values to detect a surface irregularity.

Figure 12:
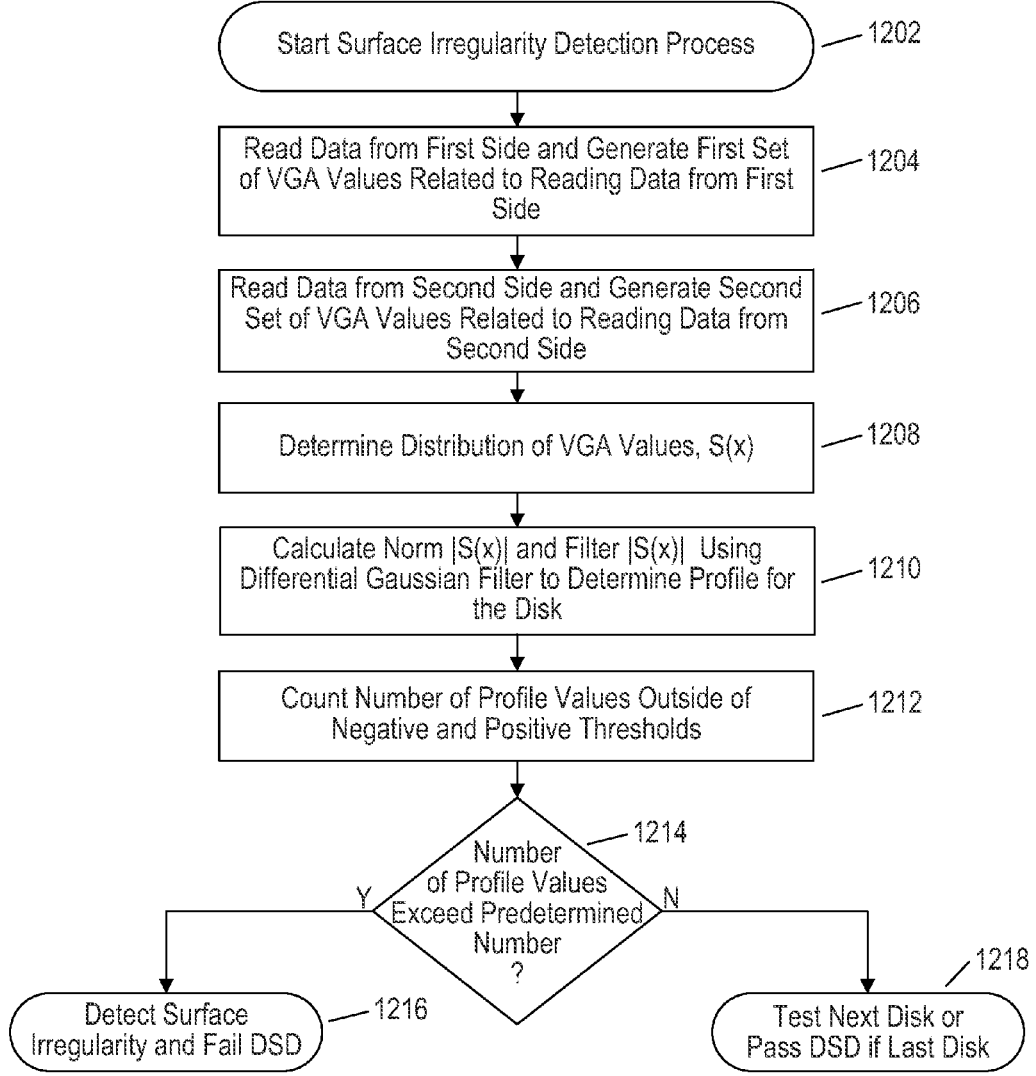
FIG. 12 is a flowchart for a surface irregularity detection process using a distribution of VGA values according to an embodiment.

FIG. 12 is a flowchart for a surface irregularity detection process that can be performed by circuitry 108 of DSD 106 using a distribution of VGA values. In other embodiments, the process of FIG. 12 or portions of the process may be performed by host device 101. The surface irregularity detection process begins in block 1202. As noted above, the detection process may be part of a factory quality control process or may be performed in the field after a drive has left the factory. The initiation of the detection process may be in response to an input received from host device 101 via host interface 126 or may be self-initiated by firmware of DSD 106 during a first startup of DSD 106.

In block 1204, circuitry 108 controls a first head of HSA 136 to read data from a first surface of a first disk (e.g., surface 226 of disk 206). The data read in block 1204 may have been previously written by the first head as test data or as part of servo wedges $204_0$-$204_N$. The data read in block 1204 can be from an inner diameter of the disk since disk surface irregularities are typically more pronounced at an inner diameter than at an outer diameter. In other implementations, the first head may read data from other radial locations on the first surface.

Circuitry 108 also generates a first set of VGA values (e.g., SVGA values) corresponding to a distance between the first head and the first surface. As discussed above with reference to FIG. 1C, VGA values can include a VGA setting (e.g., VGA setting 48) or a gain error used to determine the VGA setting.

In block 1206, circuitry 108 controls a second head of HSA 136 to read data from a second surface of the first disk (e.g., surface 228 of disk 206). As with the first surface of the disk, the data read from the second surface may have been previously written by the second head as test data or as part of servo wedges on the disk. The second head may also read the data from an inner diameter of the disk since surface irregularities are typically more pronounced at an inner diameter than at an outer diameter. Circuitry 108 also generates a second set of VGA values corresponding to a distance between the second head and the second surface.

In block 1208, controller 120 determines a distribution of VGA values (e.g., the distribution of FIG. 11A) represented as $S(x)$. The first set of VGA values and the second set of VGA values are correlated in the distribution by radial location on the disk (e.g., by wedge number). Controller 120 in block 1210 filters the absolute value of the distribution $S(x)$ using a differential Gaussian filter to determine a profile for the disk.

In block 1212, controller 120 counts a number of profile values based on the profile determined in block 1210 that fall outside of upper and lower thresholds. In other embodiments, controller 120 in block 1212 may instead determine whether the profile falls outside of upper and lower thresholds. In such embodiments, controller 120 can detect a surface irregularity when the profile falls outside of both thresholds.

In the embodiment of FIG. 12, controller 120 determines in block 1214 whether the number of profile values counted in block 1212 exceeds a predetermined number. If so, controller 120 detects a surface irregularity and fails the DSD in block 1216. In this regard, controller 120 may send a failure notification to host device 101 indicating that a surface irregularity has been detected for a disk in DSD 106.

If it is determined in block 1214 that the profile does not exceed the threshold, circuitry 108 in block 1218 proceeds to testing a next disk in DSD 106 if there are untested disks remaining. If there are no other disks to test in DSD 106, controller 120 may indicate that DSD 106 has passed a surface irregularity test by sending a notification to host device 101.

In other embodiments, multiple disks may be tested at the same time rather than sequentially testing each disk.

In addition to or in place of filtering, VGA values for multiple tracks on a disk can be averaged for groups of adjacent tracks to reduce the effect of noise or other variances in VGA values not related to surface irregularities. FIGS. 13A to 13F illustrate sets of VGA values and their corresponding profiles, with FIGS. 13C to 13F illustrating the effect of averaging VGA values for groups of adjacent tracks.

The example of FIG. 13A depicts example VGA values for a first side and a second side of a disk without any averaging as indicated by N=1 track. As shown in FIG. 13A, there is a significant amount of fluctuation in the sets of VGA values without averaging VGA values for groups of contiguous tracks. The corresponding profile based on the sets of VGA values from FIG. 13A similarly show significant fluctuation.

FIG. 13C illustrates VGA values for the same disk under the same conditions, however, in FIG. 13C the VGA values are averaged for groups of N=20 contiguous tracks in generating the sets of VGA values. As shown in FIG. 13C, averaging the VGA values for groups of 20 contiguous tracks provides smoother sets of VGA values, which ordinarily reduces the effect of unwanted noise. The corresponding profile of FIG. 13D also shows less fluctuation than the profile of FIG. 13B, which can improve the accuracy of detecting surface irregularities in the disclosed processes.

FIG. 13E illustrates sets of VGA values for the same disk as in FIGS. 13A to 13D under the same conditions, but instead averages the sets of VGA values for groups of N=40 contiguous tracks. As shown in FIG. 13E, averaging the VGA values for groups of 40 contiguous tracks provides even smoother sets of VGA values than averaging sets of VGA values for groups of 20 contiguous tracks. The corresponding profile of FIG. 13F also has less fluctuation than the profile of FIG. 13D, which can further improve the accuracy in detecting surface irregularities.

Figure 14:
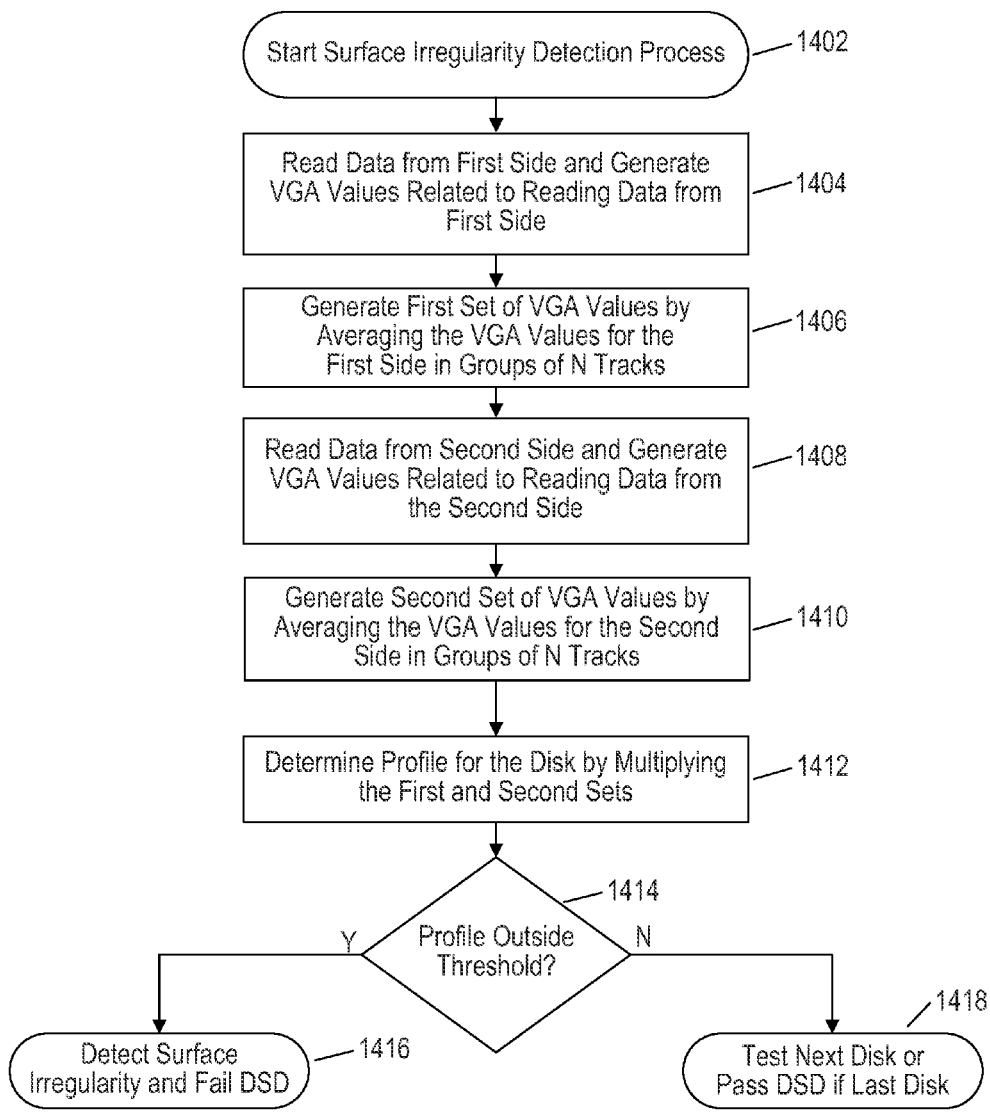
FIG. 14 is a flowchart for a surface irregularity detection process including the averaging of VGA values for multiple tracks according to an embodiment.

FIG. 14 is a flowchart for a surface irregularity detection process including the averaging of VGA values for groups of multiple tracks according to an embodiment. The process of FIG. 14 can be performed by circuitry 108 of DSD 106. In other embodiments, the process of FIG. 14 or portions of the process may be performed by host device 101. The surface irregularity detection process begins in block 1402. As noted above, the detection process may be part of a factory quality control process or may be performed in the field after a drive has left the factory. The initiation of the detection process may be in response to an input received from host device 101 via host interface 126 or may be self-initiated by firmware of DSD 106 during a first startup of DSD 106.

In block 1404, circuitry 108 controls a first head of HSA 136 to read data from a first surface of a first disk (e.g., surface 226 of disk 206). The data read in block 1404 may have been previously written by the first head as test data or as part of servo wedges $204_0$-$204_N$. The data read in block 1404 can be from an inner diameter of the disk since disk surface irregularities are typically more pronounced at an inner diameter than at an outer diameter. In other implementations, the first head may read data from other radial locations on the first surface.

Circuitry 108 also generates VGA values corresponding to a distance between the first head and the first surface. As discussed above with reference to FIG. 1C, VGA values can include a VGA setting (e.g., VGA setting 48) or a gain error used to determine the VGA setting.

In block 1406, controller 120 generates a first set of VGA values by averaging the VGA values from block 1404 for groups of contiguous tracks as discussed above with reference to FIGS. 13C to 13F. The size of the group or the number of contiguous tracks (i.e., N) may be predetermined so as to provide for a certain amount of noise reduction without sacrificing accuracy in the detection of large fluctuations caused by surface irregularities. By averaging the VGA values in groups of contiguous tracks, it is ordinarily possible to reduce the effect of noise and obtain more accurate detection of surface irregularities.

In block 1408, circuitry 108 controls a second head of HSA 136 to read data from a second surface of the first disk (e.g., surface 228 of disk 206). As with the first surface of the disk, the data read from the second surface may have been previously written by the second head as test data or as part of servo wedges on the disk. The second head may also read the data from an inner diameter of the disk since surface irregularities are typically more pronounced at an inner diameter than at an outer diameter. Circuitry 108 also generates VGA values corresponding to a distance between the second head and the second surface.

In block 1410, controller 120 generates a second set of VGA values by averaging the VGA values from block 1408 for groups of N contiguous tracks on the second side. In other embodiments, a filtering (e.g., using a differential Gaussian filter) may also be performed on the first and second sets to further reduce the effect of noise.

In block 1412, controller 120 determines a profile by multiplying the first and second sets generated in blocks 1406 and 1410. In other embodiments, the profile can be based on a difference between the first and second sets.

In block 1414, controller 120 determines whether the profile generated in block 1412 falls outside of a threshold. In other embodiments, controller 120 may instead count a number of profile values from the profile that fall outside of the threshold.

If it is determined in block 1414 that the profile falls outside of the threshold, controller 120 detects a surface irregularity and fails the DSD in block 1416. In this regard, controller 120 may send a failure notification to host device 101 indicating that a significant surface irregularity has been detected for a disk in DSD 106.

On the other hand, if it is determined in block 1414 that the profile is within the threshold, circuitry 108 in block 1418 proceeds to testing a next disk in DSD 106 if there are untested disks remaining. If there are no other disks to test in DSD 106, controller 120 may indicate that DSD 106 has passed a surface irregularity test by sending a notification to host device 101.

In other embodiments, multiple disks may be tested at the same time rather than sequentially testing each disk.

Those of ordinary skill in the art will appreciate that the various illustrative logical blocks, modules, and processes described in connection with the examples disclosed herein may be implemented as electronic hardware, computer software, or combinations of both. Furthermore, the foregoing processes can be embodied on a computer readable medium which causes a processor or computer to perform or execute certain functions.

To clearly illustrate this interchangeability of hardware and software, various illustrative components, blocks, and modules have been described above generally in terms of their functionality. Whether such functionality is implemented as hardware or software depends upon the particular application and design constraints imposed on the overall system. Those of ordinary skill in the art may implement the described functionality in varying ways for each particular application, but such implementation decisions should not be interpreted as causing a departure from the scope of the present disclosure.

The various illustrative logical blocks, units, modules, and controllers described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The activities of a method or process described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable media, an optical media, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC).

The foregoing description of the disclosed example embodiments is provided to enable any person of ordinary skill in the art to make or use the embodiments in the present disclosure. Various modifications to these examples will be readily apparent to those of ordinary skill in the art, and the principles disclosed herein may be applied to other examples without departing from the spirit or scope of the present disclosure. The described embodiments are to be considered in all respects only as illustrative and not restrictive and the scope of the disclosure is, therefore, indicated by the following claims rather than by the foregoing description. All changes which come within the meaning and range of equivalency of the claims are to be embraced within their scope.

What is claimed is:

1. A data storage device (DSD) comprising:
 a disk including a first side for storing data and a second side for storing data;
 a first head for reading data from the first side;
 a second head for reading data from the second side; and
 circuitry configured to:
  control the first head to read data from the first side;
  generate a first set of variable gain amplifier (VGA) values related to the reading of data from the first side using the first head;
  control the second head to read data from the second side;
  generate a second set of VGA values related to the reading of data from the second side using the second head;
  determine a profile for the disk using the first set of VGA values and the second set of VGA values;
  set at least one threshold based on the profile; and
  compare the profile to the at least one threshold to detect surface irregularities on the disk.

2. The DSD of claim 1, wherein the circuitry is further configured to:
 exclude an outermost portion of the profile; and
 set the at least one threshold as a multiple of an average of values from a remaining portion of the profile.

3. The DSD of claim 1, wherein the at least one threshold includes an upper threshold and a lower threshold.

4. The DSD of claim 1, wherein the circuitry is further configured to:
 generate the first set of VGA values by averaging VGA values for groups of contiguous tracks on the first side; and
 generate the second set of VGA values by averaging VGA values for groups of contiguous tracks on the second side.

5. The DSD of claim 1, wherein the circuitry is further configured to determine the profile by filtering the first set of VGA values and filtering the second set of VGA values.

6. The DSD of claim 5, wherein the circuitry is further configured to determine the profile by multiplying the filtered first set of VGA values with the filtered second set of VGA values.

7. The DSD of claim 1, wherein the circuitry is further configured to:
 determine a distribution for the first set of VGA values and the second set of VGA values, wherein the first set of VGA values and the second set of VGA values are correlated in the distribution by a radial location on the disk; and
 determine the profile by applying a differential Gaussian filter to a norm of the distribution.

8. The DSD of claim 1, wherein the circuitry is further configured to determine the profile by multiplying the first set of VGA values with the second set of VGA values.

9. The DSD of claim 1, wherein the circuitry is further configured to determine the profile by taking a difference between the first set of VGA values and the second set of VGA values.

10. The DSD of claim 1, wherein the circuitry is further configured to detect surface irregularities on the disk if the profile is outside of the at least one threshold or if more than a predetermined number of values from the profile are outside of the at least one threshold.

11. The DSD of claim 1, wherein the generated first and second sets of VGA values include servo VGA (SVGA) values related to the reading of data from servo wedges on the disk.

12. The DSD of claim 1, wherein the circuitry is further configured to filter the first set of VGA values and the second set of VGA values using a differential Gaussian filter.

13. A method for detecting surface irregularities on a disk of a data storage device (DSD), the method comprising:
 reading data from a first side of the disk using a first head of the DSD;
 generating a first set of variable gain amplifier (VGA) values related to the reading of data from the first side using the first head;
 reading data from a second side of the disk using a second head of the DSD;
 generating a second set of VGA values related to the reading of data from the second side using the second head;
 determining a profile for the disk using the first set of VGA values and the second set of VGA values;
 setting at least one threshold based on the profile; and
 comparing the profile to the at least one threshold to detect surface irregularities on the disk.

14. The method of claim 13, further comprising:
 excluding an outermost portion of the profile; and
 setting the at least one threshold as a multiple of an average of values from a remaining portion of the profile.

15. The method of claim 13, wherein the at least one threshold includes an upper threshold and a lower threshold.

16. The method of claim 13, further comprising:
 generating the first set of VGA values by averaging VGA values for groups of contiguous tracks on the first side; and
 generating the second set of VGA values by averaging VGA values for groups of contiguous tracks on the second side.

17. The method of claim 13, further comprising determining the profile by filtering the first set of VGA values and filtering the second set of VGA values.

18. The method of claim 17, further comprising determining the profile by multiplying the filtered first set of VGA values with the filtered second set of VGA values.

19. The method of claim 13, further comprising:
  determining a distribution for the first set of VGA values and the second set of VGA values, wherein the first set of VGA values and the second set of VGA values are correlated in the distribution by a radial location on the disk; and
  determining the profile by applying a differential Gaussian filter to a norm of the distribution.

20. The method of claim 13, further comprising determining the profile by multiplying the first set of VGA values with the second set of VGA values.

21. The method of claim 13, further comprising determining the profile by taking a difference between the first set of VGA values and the second set of VGA values.

22. The method of claim 13, further comprising detecting surface irregularities on the disk if the profile is outside of the at least one threshold or if more than a predetermined number of values from the profile are outside of the at least one threshold.

23. The method of claim 13, wherein the generated first and second sets of VGA values include servo VGA (SVGA) values related to the reading of data from servo wedges on the disk.

24. The method of claim 13, further comprising filtering the first set of VGA values and the second set of VGA values using a differential Gaussian filter.

* * * * *